United States Patent
Ferrara et al.

(10) Patent No.: US 11,818,218 B2
(45) Date of Patent: Nov. 14, 2023

(54) SYSTEM, METHOD, AND COMPUTER-READABLE STORAGE MEDIUM THAT ESTABLISH A COMMUNICATION PATH BETWEEN A MOBILE DEVICE AND A NON-MOBILE DEVICE

(71) Applicant: THE VANGUARD GROUP, INC., Valley Forge, PA (US)

(72) Inventors: John C. Ferrara, Eagleville, PA (US); Scott Lind, Downingtown, PA (US)

(73) Assignee: THE VANGUARD GROUP, INC., Valley Forge, PA (US)

(*) Notice: Subject to any disclaimer, the term of this patent is extended or adjusted under 35 U.S.C. 154(b) by 449 days.

(21) Appl. No.: 15/894,628

(22) Filed: Feb. 12, 2018

(65) Prior Publication Data

US 2019/0253499 A1    Aug. 15, 2019

(51) Int. Cl.
| | | |
|---|---|---|
| H04L 67/141 | (2022.01) | |
| H04L 51/08 | (2022.01) | |
| H04L 67/02 | (2022.01) | |
| H04L 67/00 | (2022.01) | |
| H04W 4/14 | (2009.01) | |
| G06F 3/04842 | (2022.01) | |

(52) U.S. Cl.
CPC .......... *H04L 67/141* (2013.01); *H04L 51/08* (2013.01); *H04L 67/02* (2013.01); *H04L 67/34* (2013.01); *H04W 4/14* (2013.01); *G06F 3/04842* (2013.01)

(58) Field of Classification Search
CPC ....... H04L 67/141; H04L 51/08; H04L 67/02; H04L 67/34; H04W 4/14; G06F 3/04842
See application file for complete search history.

(56) References Cited

U.S. PATENT DOCUMENTS

| | | | |
|---|---|---|---|
| 9,300,645 B1 | 3/2016 | Rao et al. | |
| 9,875,511 B1* | 1/2018 | Baubert | H04N 5/225 |
| 2006/0218396 A1 | 9/2006 | Laitinen et al. | |
| 2009/0106356 A1* | 4/2009 | Brase | H04L 65/4084 |
| | | | 709/203 |

(Continued)

FOREIGN PATENT DOCUMENTS

IN    201200376 I3    10/2013

*Primary Examiner* — Bharat Barot
*Assistant Examiner* — Sujana Khakural
(74) *Attorney, Agent, or Firm* — Oblon, McClelland, Maier & Neustadt, L.L.P.

(57) ABSTRACT

A system, method, and computer readable-storage medium establishing a communication path between a mobile device and a non-mobile device. The method includes controlling display of a webpage for display on the non-mobile device, receiving data input via the webpage, the data including a mobile number associated with the mobile device, transmitting a message using the mobile number received from the non-mobile device, the message including a hyperlink that includes a uniform resource locator (URL), in response to performing a function at the mobile device, receiving a response associated with the function performed, coordinating communication between the mobile device and the non-mobile device to transmit the response through a communication path to the non-mobile device, and controlling display of the response received from the mobile device in the webpage of the non-mobile device.

16 Claims, 37 Drawing Sheets

(56) References Cited

U.S. PATENT DOCUMENTS

| | | | |
|---|---|---|---|
| 2011/0179289 A1* | 7/2011 | Guenther | G06F 21/64 |
| | | | 713/189 |
| 2012/0271768 A1 | 10/2012 | Kang | |
| 2013/0263283 A1* | 10/2013 | Peterson | G06F 21/6218 |
| | | | 726/28 |
| 2013/0308778 A1 | 11/2013 | Fosmark et al. | |
| 2014/0162598 A1 | 6/2014 | Villa-Real | |
| 2014/0333713 A1 | 11/2014 | Shoemake et al. | |
| 2015/0036001 A1* | 2/2015 | Shibuno | H04N 5/23206 |
| | | | 348/207.1 |
| 2015/0195092 A1 | 7/2015 | Bartkiewicz et al. | |
| 2015/0237031 A1 | 8/2015 | Neuman et al. | |
| 2015/0334564 A1* | 11/2015 | McClure | H04L 63/18 |
| | | | 726/7 |
| 2016/0014192 A1 | 1/2016 | Lim et al. | |
| 2016/0226950 A1* | 8/2016 | Goel | H04L 67/1097 |
| 2017/0011440 A1* | 1/2017 | Shauh | G06Q 30/0613 |
| 2017/0135142 A1* | 5/2017 | Bartlett, II | H04L 67/141 |
| 2017/0243225 A1 | 8/2017 | Kohli | |
| 2017/0277727 A1* | 9/2017 | Chen | G06F 16/2465 |
| 2017/0344256 A1* | 11/2017 | Gnedin | G06Q 30/0241 |

\* cited by examiner

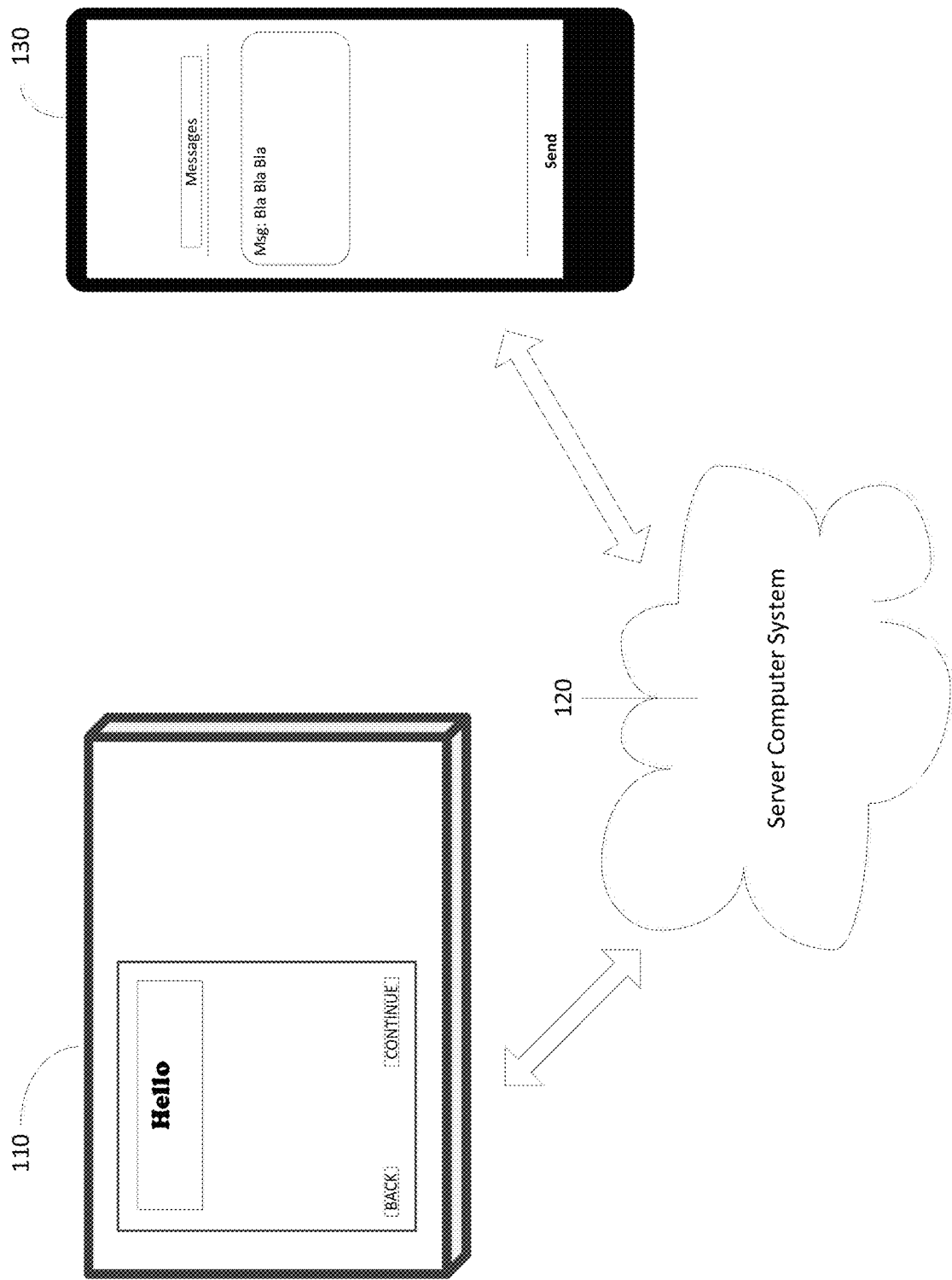

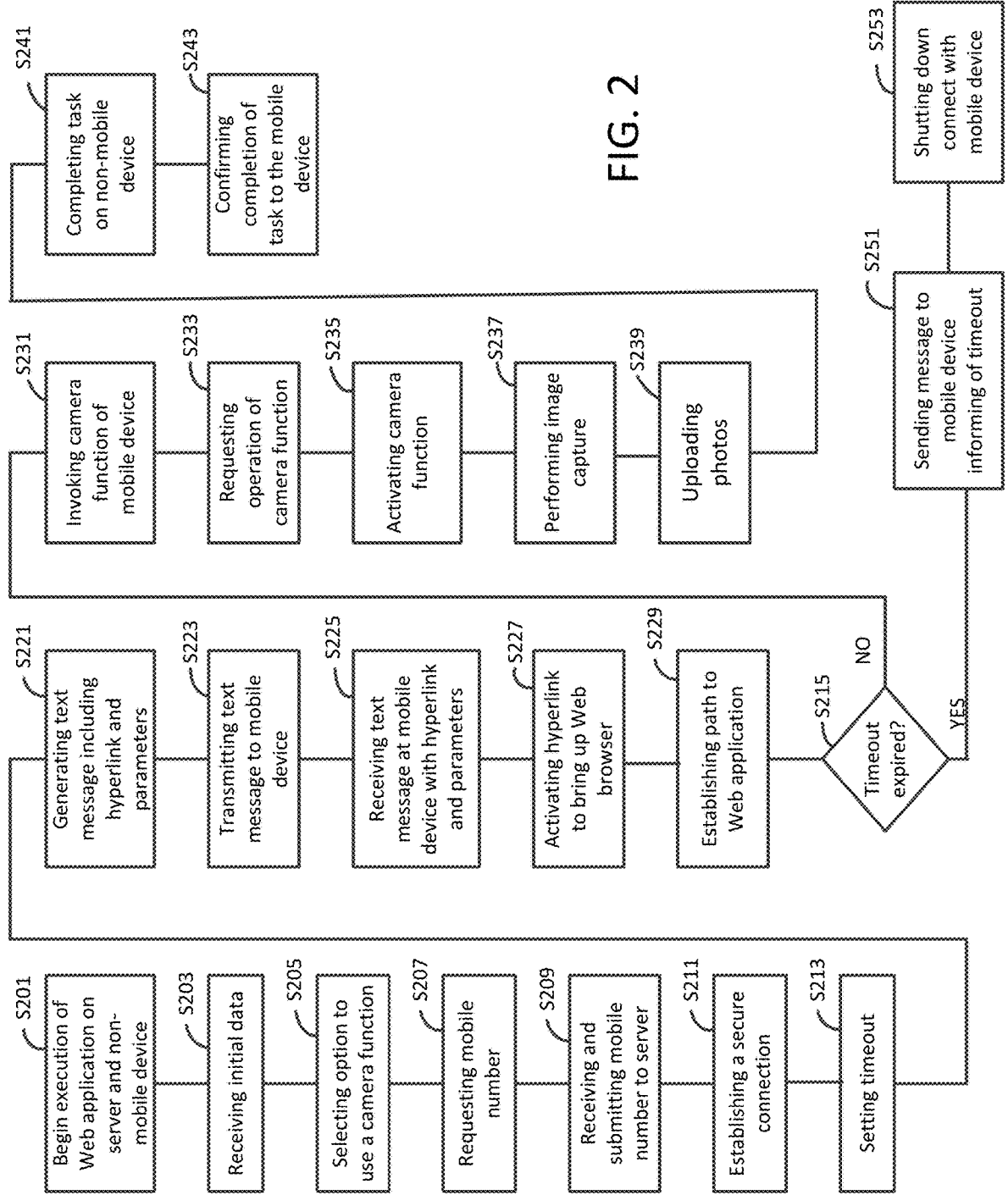

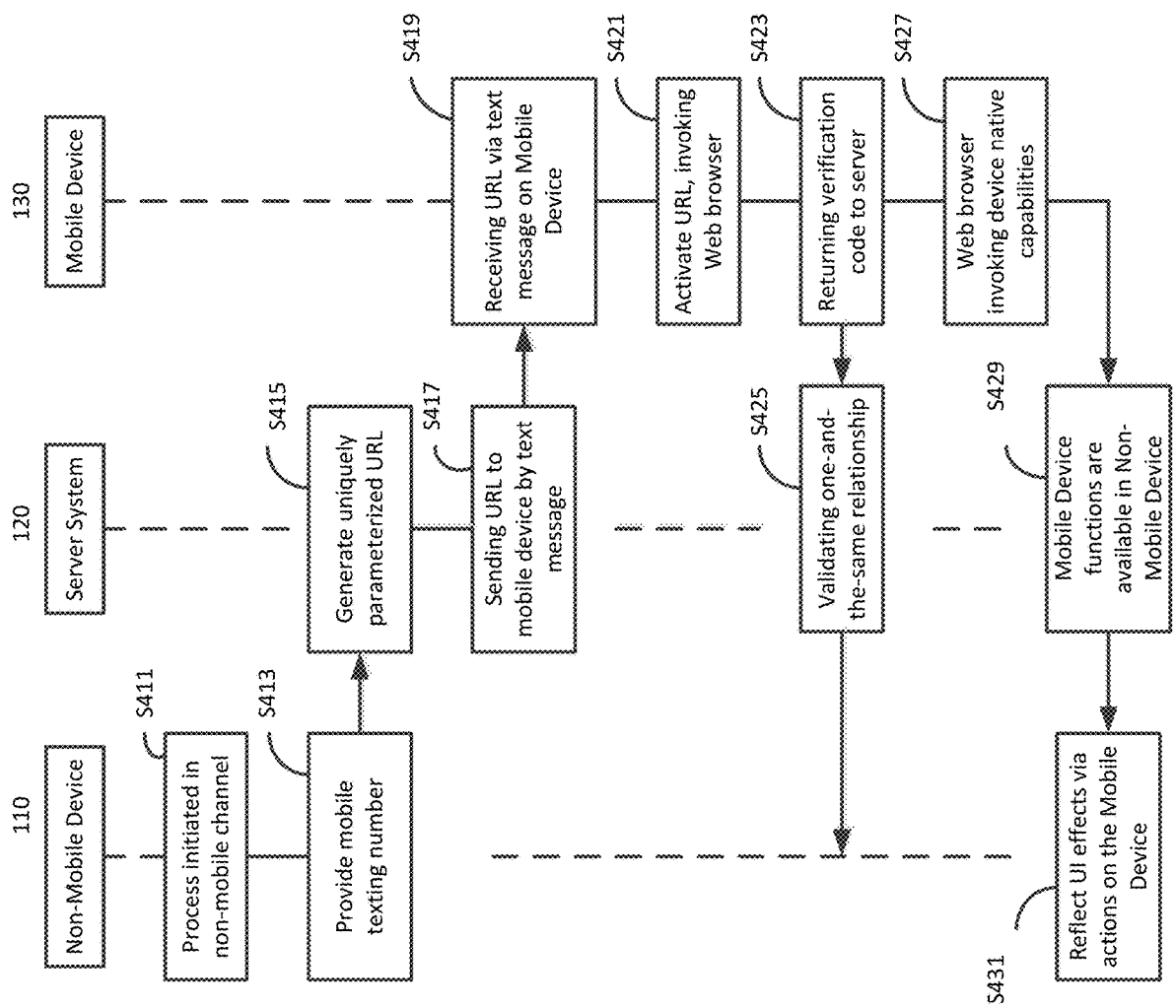

FIG. 7A

How will this be completed?

Image

Mobile Number for Text Messages:

605

603

601

John Smith

Item 1:  21,000.00     500.00
Item 2:  15,000.00     Individual
Item 3:  4,444.00      0.00

CLEAR

CANCEL

CONTINUE

SYSTEM, METHOD, AND COMPUTER-READABLE STORAGE MEDIUM THAT ESTABLISH A COMMUNICATION PATH BETWEEN A MOBILE DEVICE AND A NON-MOBILE DEVICE

FIELD OF THE DISCLOSURE

The present disclosure relates generally to a method to establish a one-and-the-same relationship between a process initiated by a non-mobile device and extended to include a process for a mobile device, for example, a contemporaneous relationship or a sequential handoff from one device to the other.

BACKGROUND

Wireless mobile devices are being introduced that include an ever increasing variety of built-in functions. For example, smartphones are being equipped with touchscreens that can detect direct touch, proximate touch, three dimensional touch, as well as detect an image of the object that is proximate or touching the surface of the touchscreen. For example, the touchscreen can detect an object that is just a short distance from the screen, or even scan a pattern that is a close distance from the screen. Touchscreens in smartphones can detect three dimensional touch such that the smartphone knows not just that the screen has been touched, but the degree of touch. A substantially prevalent feature of smartphones is the inclusion of one or two image capturing elements, or cameras. Generally, smartphones are being equipped with a rear camera for capturing images of objects, while the screen shows the image being captured by the camera. Being smartphones, a universal function is a microphone and speaker. Applications, such as search engine applications, can convert a spoken word or phrase into text for searching. The microphone enables speech to be recorded, and even transferred as a file to another device.

Increasingly, smartphones and other mobile devices are being equipped with short range communications capabilities such that they can be used for remotely controlling other devices. Such short range communications may be implemented to communicate using Internet protocols using technologies such as WiFi®, WiFi Direct®, and Bluetooth®.

Also, smartphones and other mobile devices are being equipped with data communications capabilities through wireless Internet protocols. Applications such as e-mail are now available on a mobile device such that files may be transferred over the Internet, either as attachments, or by way of other communication services, such as text messaging.

Thus, smartphones and other mobile devices are being equipped with an ever increasing variety of functions that are often not available on desktop computers typically found in office settings. Despite the ever increasing functions that are being included in mobile devices, the mobile devices have limitations, such as limited screen size and small keyboard for data entry, that sometimes makes use of mobile devices less convenient to use than desktop computers for certain tasks.

Desktop computer systems found in, for example, office environments, also have limitations. Desktop computer systems may be equipped with certain basic input/output functionality, including a mouse, or other pointing device, for controlling a pointer on a display screen, and a keyboard for inputting character data. It is possible to attach other devices to these desktop computers via an input port such as a universal serial bus (USB) port. Devices that may be attached include a microphone, a camera, scanner, and a touchpad.

Although it may be possible for a mobile device to run a Web browser that is comparable to a Web browser found on a desktop computer, the limitations in size of screen and small keyboard make certain tasks, such as filling out forms, or attaching documents to forms, not practical. Some websites provide pages that are specifically tailored for small screen devices. In most cases, apps that are applications specifically written for mobile devices and their respective operating system, provide a user interface that is suitable for the particular mobile device. However, apps require that they be downloaded and installed. Also, as apps become more prevalent, they can become lost among the several screens of apps available on a mobile device.

When computer systems at two locations need to work in a coordinated manner to accomplish a task, differences in device capabilities can be a burden to practically accomplishing the task. For example, if a desktop computer is being used to fill out a form, but requires information from a user having a mobile device, even if both users can access the same form, the user of the mobile device will have to locate a position in the form that information is to be entered, again using a screen that is much smaller and a much smaller keyboard for data entry. It may not be clear to the user of the mobile device whether the location that is scrolled to on the screen of the mobile device is the appropriate location, and whether the data that is entered is the complete information.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a system establishing a communication path between a mobile device and a non-mobile device. The system including at least one server including circuitry configured to control display of a webpage for display on the non-mobile device, receive, from the non-mobile device data input via the webpage, the data including a mobile number associated with the mobile device, transmit, to the mobile device, a message using the mobile number received from the non-mobile device, the message including a hyperlink that includes a uniform resource locator (URL) for a microapplication. In response to the hyperlink being activated on the mobile device, the circuitry is configured to establish the communication path between the mobile device and the non-mobile device, and control display, via the microapplication, of content on the mobile device. In response to performing a function at the mobile device, the circuitry is configured to receive a response associated with the function performed via the microapplication, coordinate communication between the mobile device and the non-mobile device to transmit the response through the communication path to the non-mobile device, and control display of the response received from the mobile device in the webpage of the non-mobile device.

The present disclosure also relates to a method establishing a communication path between a mobile device and a non-mobile device. The method including controlling display, using circuitry, of a webpage for display on the non-mobile device; receiving, using the circuitry, from the non-mobile device, data input via the webpage, the data including a mobile number associated with the mobile device; transmitting, using the circuitry, to the mobile device, a message using the mobile number received from the non-mobile device, the message including a hyperlink that includes a uniform resource locator (URL). In response to the hyperlink being activated on the mobile device, the method includes establishing, using the circuitry, the communication path between the mobile device and the non-mobile device, and controlling display of content on the mobile device. In response to performing a function at the mobile device, the method includes receiving, using the circuitry, a response associated with the function performed; coordinating, using the circuitry, communication between the mobile device and the non-mobile device to transmit the response through the communication path to the non-mobile device; and controlling display, using the circuitry, of the response received from the mobile device in the webpage of the non-mobile device.

The present disclosure also relates to a non-transitory computer-readable storage medium including computer executable instructions. The instructions, when executed by a computer, cause the computer to perform a method for establishing a communication path between a mobile device and a non-mobile device. The method including controlling display of a webpage for display on the non-mobile device; receiving from the non-mobile device, data input via the webpage, the data including a mobile number associated with the mobile device; transmitting to the mobile device, a message using the mobile number received from the non-mobile device, the message including a hyperlink that includes a uniform resource locator (URL). In response to the hyperlink being activated on the mobile device, establishing, using the circuitry, the communication path between the mobile device and the non-mobile device, and controlling display of content on the mobile device. In response to performing a function at the mobile device, receiving a response associated with the function performed; coordinating communication between the mobile device and the non-mobile device to transmit the response through the communication path to the non-mobile device; and controlling display of the response received from the mobile device in the webpage of the non-mobile device.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a block diagram of a computer system according to an exemplary aspect of the disclosure;

FIG. 2 is a flowchart for an example process of extending a mobile device's camera function to a non-mobile device according to an exemplary aspect of the disclosure;

FIG. 4 is a sequence diagram of a method of extending the functions of a mobile device to a non-mobile device according to an exemplary aspect of the disclosure;

FIGS. 7A to 7F show example displays for a process of establishing a one-and-the-same relationship between a mobile device's camera function and a non-mobile device according to an exemplary aspect of the disclosure;

DETAILED DESCRIPTION

Figure 3A:
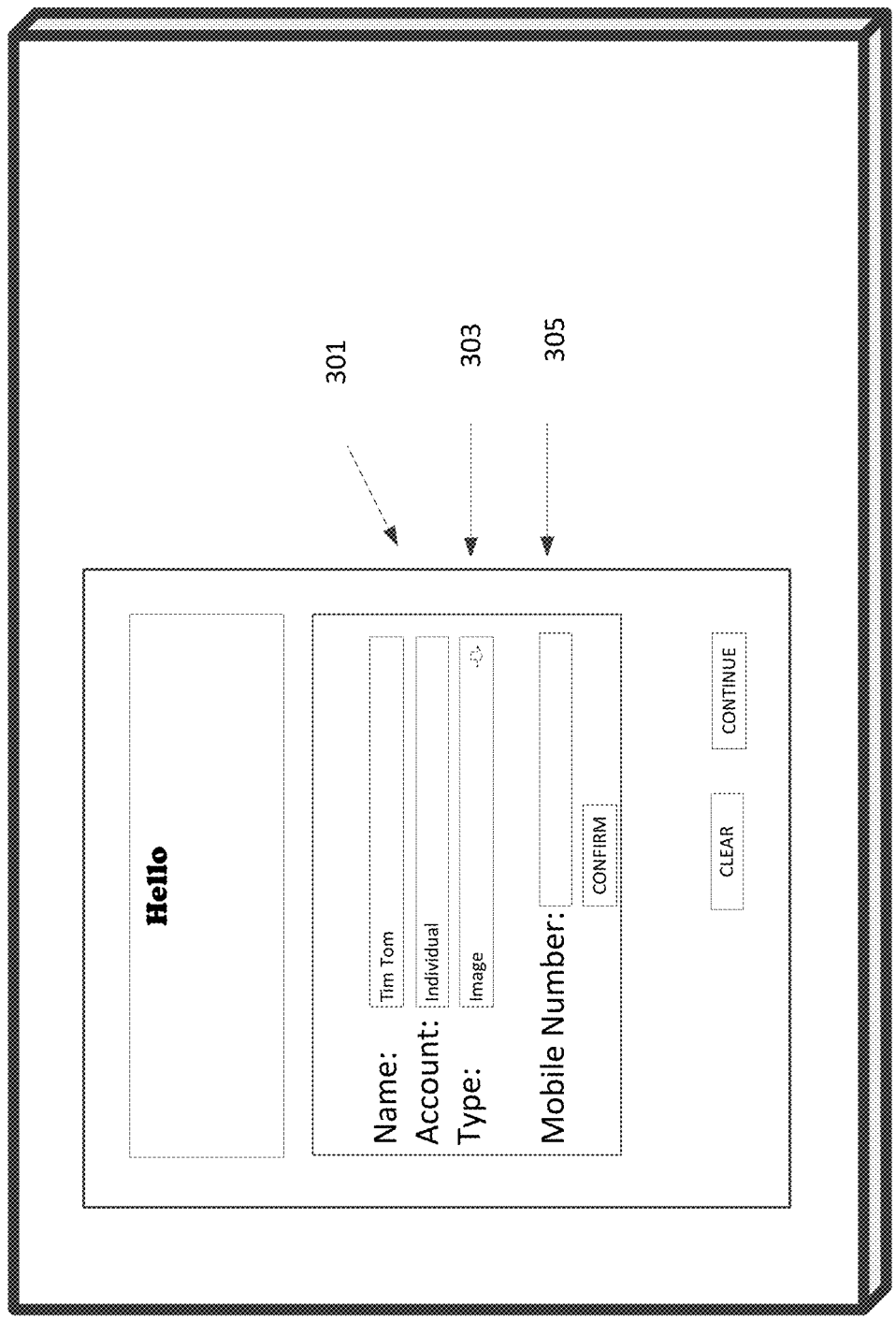
FIGS. 3A to 3K show example displays for a process of extending a mobile device's camera function to a non-mobile device according to an exemplary aspect of the disclosure.

Referring now to the drawings, wherein like reference numerals designate identical or corresponding parts throughout several views, the following description relates to exemplary approaches to establishing a one-and-the-same relationship in a server (or one or more servers) between a process in a mobile device and a process in a non-mobile device.

The various elements, features and processes described herein may be used independently of one another, or may be combined in various ways. All possible combinations and subcombinations are intended to fall within the scope of this disclosure. Further, nothing in the foregoing description is intended to imply that any particular feature, element, component, characteristic, step, module, method, process, task, or block is necessary or indispensable. The example systems and components described herein may be configured differently than described. For example, elements or components may be added to, removed from, or rearranged compared to the disclosed examples.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

The present disclosure relates to: (1) A system establishing a communication path between a mobile device and a non-mobile device, the system including at least one server including circuitry configured to control display of a webpage for display on the non-mobile device, receive, from the non-mobile device data input via the webpage, the data including a mobile number associated with the mobile device, transmit, to the mobile device, a message using the mobile number received from the non-mobile device, the message including a hyperlink that includes a uniform resource locator (URL) for a microapplication. In response to the hyperlink being activated on the mobile device, the circuitry is configured to establish the communication path between the mobile device and the non-mobile device, and control display, via the microapplication, of content on the mobile device. In response to performing a function at the mobile device, the circuitry is configured to receive a response associated with the function performed via the microapplication, coordinate communication between the mobile device and the non-mobile device to transmit the response through the communication path to the non-mobile device, and control display of the response received from the mobile device in the webpage of the non-mobile device.

(2) The system of feature (1), in which the hyperlink includes a validation parameter, and the communication path between the mobile device and the non-mobile device is established using the validation parameter.

(3) The system of features (1) or (2), in which the microapplication includes content obtained from the webpage displayed in the non-mobile device, and the microapplication is performed by a browser to control display of the content in the mobile device.

(4) The system of features (1) or (2), in which the microapplication includes content obtained from the webpage displayed in the non-mobile device, and the microapplication is performed by a mobile e-mail app to control display of the content in the mobile device.

(5) The system of any of features (1) to (4), in which the circuitry is further configured to disable the communication path between the mobile device and the non-mobile device after a predetermined amount of time from a time the message is sent to the mobile device, in response to the response not being received from the mobile device.

(6) The system of feature (5), in which the circuitry is further configured to, when the predetermined amount of time is reached, store the hyperlink in a folder so that the Web application can be accessed at a later time.

(7) The system of any of features (1) to (6), in which the function is a camera function and the received response is an image of a document obtained using the camera function, and the coordination of the mobile device and the non-mobile device is such that the circuitry is configured to control displaying at the non-mobile device, the image at a time that the image is obtained using the camera function at the mobile device.

(8) The system of any of features (1) to (7), in which the function is a touch input function and the received response is an electronic signature, and the coordination of the mobile device and the non-mobile device is such that the circuitry is configured to control displaying at the non-mobile device, the electronic signature at a time that the electronic signature is obtained using the touch input function at the mobile device.

(9) The system of any of features (1) to (8), in which the function is a touch input function and the received response includes blocks of a predetermined number of pixels for respective portions of an electronic signature, and the coordination of the mobile device and the non-mobile device is such that the circuitry is configured to control displaying at the non-mobile device, the respective portions of the electronic signature in a synchronous fashion with the obtaining of the respective portions of the electronic signature via the touch input function at the mobile device.

The present disclosure also relates to: (10) A method establishing a communication path between a mobile device and a non-mobile device. The method including controlling display, using circuitry, of a webpage for display on the non-mobile device; receiving, using the circuitry, from the non-mobile device, data input via the webpage, the data including a mobile number associated with the mobile device; transmitting, using the circuitry, to the mobile device, a message using the mobile number received from the non-mobile device, the message including a hyperlink that includes a uniform resource locator (URL). In response to the hyperlink being activated on the mobile device, the method establishing, using the circuitry, the communication path between the mobile device and the non-mobile device, and controlling display of content on the mobile device. In response to performing a function at the mobile device, the method receiving, using the circuitry, a response associated with the function performed; coordinating, using the circuitry, communication between the mobile device and the non-mobile device to transmit the response through the communication path to the non-mobile device; and controlling display, using the circuitry, of the response received from the mobile device in the webpage of the non-mobile device.

(11) The method of feature (10), in which the hyperlink includes a validation parameter, and the establishing establishes the communication path between the mobile device and the non-mobile device using the validation parameter.

(12) The method of features (10) or (11), in which the function includes content obtained from the webpage displayed in the non-mobile device, and a browser controls display of the content in the mobile device.

(13) The method of features (10) or (11), in which the function includes content obtained from the webpage displayed in the non-mobile device, and a mobile e-mail app controls display of the content in the mobile device.

(14) The method of any of features (10) to (13), further including disabling the communication path between the mobile device and the non-mobile device after a predetermined amount of time from a time the message is sent to the mobile device, in response to the response not being received from the mobile device.

(15) The method of feature (14), further including, when the predetermined amount of time is reached, storing the hyperlink in a folder so that the communication path can be established at a later time.

(16) The method of any of features (10) to (15), in which the function is a camera function and the received response is an image of a document obtained using the camera function, and the coordinating of the mobile device and the non-mobile device is such that the display in the non-mobile device displays the image at a time that the image is obtained using the camera function at the mobile device.

(17) The method of any of features (10) to (16), in which the function is a touch input function and the received response is an electronic signature, and the coordinating of the mobile device and the non-mobile device is such that the display in the non-mobile device displays the electronic signature at a time that the electronic signature is obtained using the touch input function at the mobile device.

(18) The method of any of features (10) to (17), in which the function is a touch input function and the received response includes blocks of a predetermined number of pixels for respective portions of an electronic signature, and the coordinating of the mobile device and the non-mobile device is such that the display in the non-mobile device displays the respective portions of the electronic signature in a synchronous fashion with the obtaining of the respective portions of the electronic signature via the touch input function at the mobile device.

The present disclosure also relates to: (19) A non-transitory computer-readable storage medium including computer executable instructions, in which the instructions, when executed by a computer, cause the computer to perform a method for establishing a communication path between a mobile device and a non-mobile device. The method including controlling display of a webpage for display on the non-mobile device; receiving from the non-mobile device, data input via the webpage, the data including a mobile number associated with the mobile device; transmitting to the mobile device, a message using the mobile number received from the non-mobile device, the message including a hyperlink that includes a uniform resource locator (URL). In response to the hyperlink being activated on the mobile device, the method includes establishing, using the circuitry, the communication path between the mobile device and the non-mobile device, and controlling display of content on the mobile device. In response to performing a function at the mobile device, the method including receiving a response associated with the function performed; coordinating communication between the mobile device and the non-mobile device to transmit the response through the communication path to the non-mobile device; and controlling display of the response received from the mobile device in the webpage of the non-mobile device.

Despite the ever increasing functions being made available on mobile devices, there is a need for utilizing functions of a mobile device in a manner that enables a complex task to be performed with minimal steps taken by the user of the mobile device. An object is to alleviate a need to perform an entire task using a mobile device. An object is to simplify involvement of a mobile device in performing a task by focusing on specific functions that can be performed using a mobile device while performing remaining operations for carrying out the task using a non-mobile device.

There is a need for applications executed on a non-mobile device having limited capabilities to share performance of a task with a mobile device that contains auxiliary functions not available on the non-mobile device. An object is a single task that is initiated using a non-mobile device and that relies on functions of a mobile device to complete the task.

There is a need for applications that are initiated on a non-mobile device to be handed over to a mobile device without having to download a complex mobile device app from an app store before the non-mobile device can hand over an initiated application. An object is a Web application that can begin operation on a non-mobile device and complete operation on a mobile device through transfer of parameterized code to be executed on the mobile device.

FIG. 1 is a block diagram of a system according to an exemplary aspect of the disclosure. The system includes a non-mobile device 110 having at least one browser program that can perform client-side operations using a Web application. The system includes a mobile device 130 having at least one browser program for mobile devices and a text messaging function. The mobile device may be configured with functions that use a touchscreen, at least one camera, and short range communications such as Bluetooth® or WiFi®. Both the non-mobile device 110 and the mobile device 130 may communicate with a server computer system 120.

The non-mobile device 110 may be any type of computer such as a desktop, personal computer (PC), a virtual machine/computer, a laptop, or the like. The mobile device 130 may be a cell phone, a smartphone, a tablet, or the like.

The server computer system 120 may include at least one server or computer. The functions described herein may be performed by only one server or computer or be distributed throughout a plurality of devices working together. The server computer system 120 may refer to at least one server computer system that provides services to external client computers. A server computer system may take on any of a variety of network architectures, ranging anywhere from a single computer platform to a virtual system being performed in the cloud. In the case of a single computer platform, the single computer typically runs a server operating system, such as a computer running a version of UNIX or Microsoft Windows Server. The single computer platform may run services for other computers on a network, including, but not limited to, a Web server, a database server or an application server. In the case of a virtual system being performed in the cloud, the functions of the server computer system may take the form of software being executed in any of several networked computers. Although vendors that offer cloud services are extensive, cloud software and infrastructure services offered by large companies include IBM Cloud, Google Cloud, Microsoft Azure Cloud, and Amazon Web Services. In between, a server computer system may include at least one front-end computer that accept and manage incoming traffic, for example performing as a Web server, and a variety of backend servers, such as a database backend or a security backend. A server computer system may be a network of service systems maintained by at least one organization. For example, a type of service system may be a messaging service that sends out alert messages, or a banking service that handles financial transactions. The original concept of a Web server serving pages to client computers for rendering by Web browsers has evolved such that more processing is being performed at the server to enable interactivity between the client computer and the server. The alternative approaches to using servers for Internet communications include Web applications and applications known as middleware. Web applications may be implemented using server-side environments including Java Server Pages, Active Server Pages, PHP, and equivalent server-side development environments. These environments generally provide programming constructs to provide communication channels between at least one client computer and a server. In a case where client computers are communicating through communication channels to a common Web application, the Web application can perform operations such as combining data sent by the client computers or enabling multi-user access to a common application, and particularly common content.

In some embodiments, the client computers include wireless mobile devices that communicate with the server computer system through wireless data channels. The client computer systems may include non-mobile computer systems having various capabilities.

An exemplary aspect is a server-side system that establishes a mutual relationship between one application running on the server computer system and another Web application so that operations resulting from functions at a mobile channel are available to the other non-mobile channel. Such a relationship enables a coordinated relationship between operations in a non-mobile channel and operations in a mobile channel.

In one embodiment, a non-mobile device 110 may be extended to include at least one function available on a mobile device 130. An exemplary aspect may be used to extend capabilities of a non-mobile device 110 to include the camera function of a mobile device 130 through a Web application that is performed on server computer system 120 to carry out a specific task. FIG. 2 is a flowchart for an example process of extending a mobile device's camera function to a non-mobile device according to an exemplary aspect of the disclosure. FIGS. 3A to 3K show example displays for a process of FIG. 2 of extending a mobile device's camera function to a non-mobile device according to an exemplary aspect of the disclosure.

In this embodiment, a Web application may indicate an option of capturing an image using a camera function of a mobile device in carrying out a task using a non-mobile device. In such case, the task may be started on the non-mobile device 110 and completed using a particular function of a mobile device 130 that is not readily available on the non-mobile device 110. As a non-limiting example, a task that can make use of a camera function on a mobile device may be a commercial application in which an online transaction requiring payment may be performed by making a payment with a check. Normally, payment by check is performed by mailing a check to an address provided during the online transaction. In such case, the transaction is not completed until the check has been received and the amount of the check is obtained from a bank institution. In the case of physical stores, payment can be made by check in person. Of course, checks may be deposited in a bank account, or may be cashed to obtain cash. This embodiment allows for payment by check to complete an online transaction. This embodiment streamlines the process of paying by check by enabling the camera function of a mobile device 130 in a manner that a check may be photographed using the camera function and submitted to complete a transaction without having to first visit an app store and downloading a mobile app that may offer various tools. Obtaining a mobile app from an app store requires downloading and installing the app, then understanding the various features that the app has to offer. A user may require assistance in using the app for a particular operation. This example embodiment eliminates the need to download a mobile app and instead provides a special purpose interface that is limited to only those operations necessary to perform an online transaction.

Figure 3B:
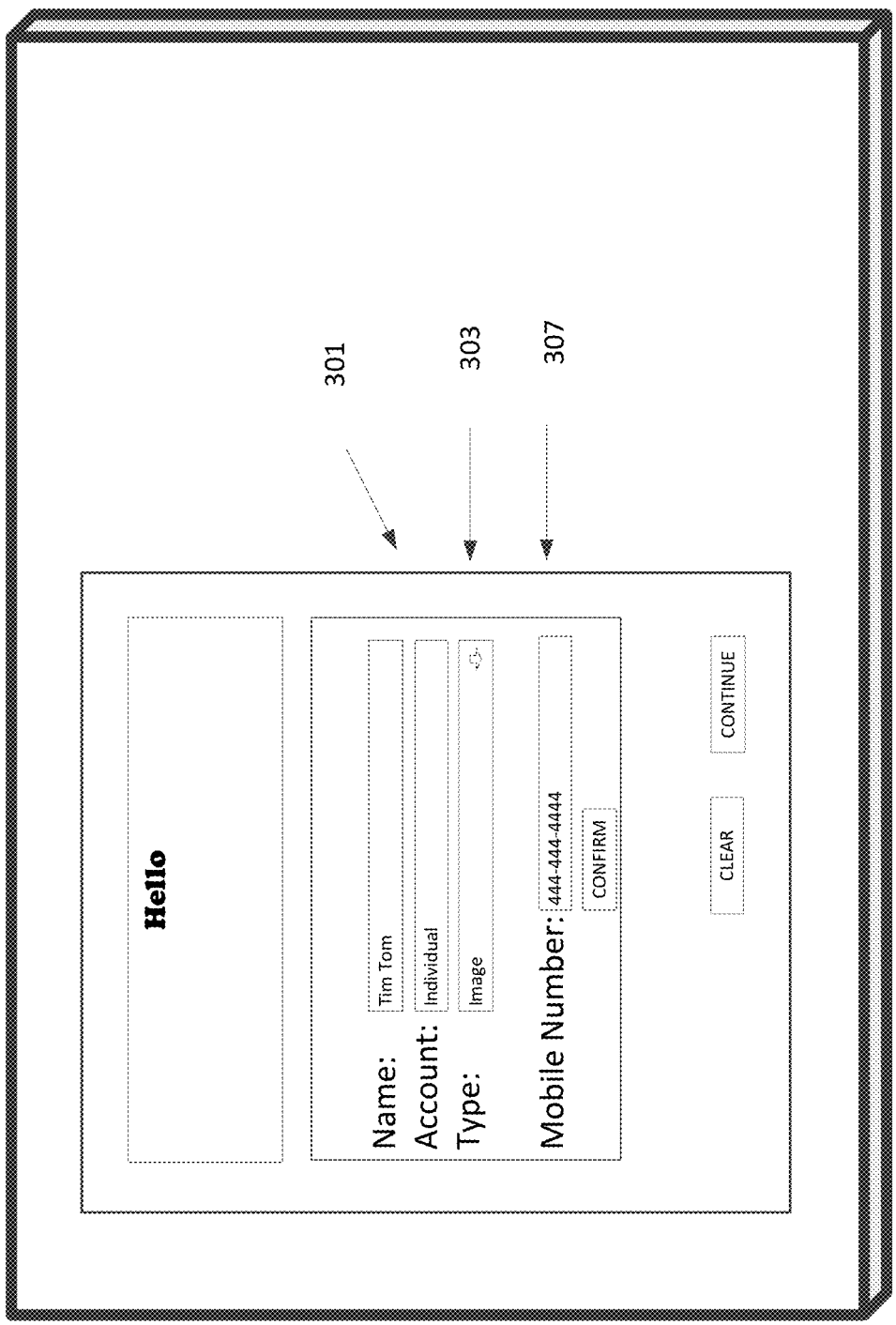
Figure 3C:
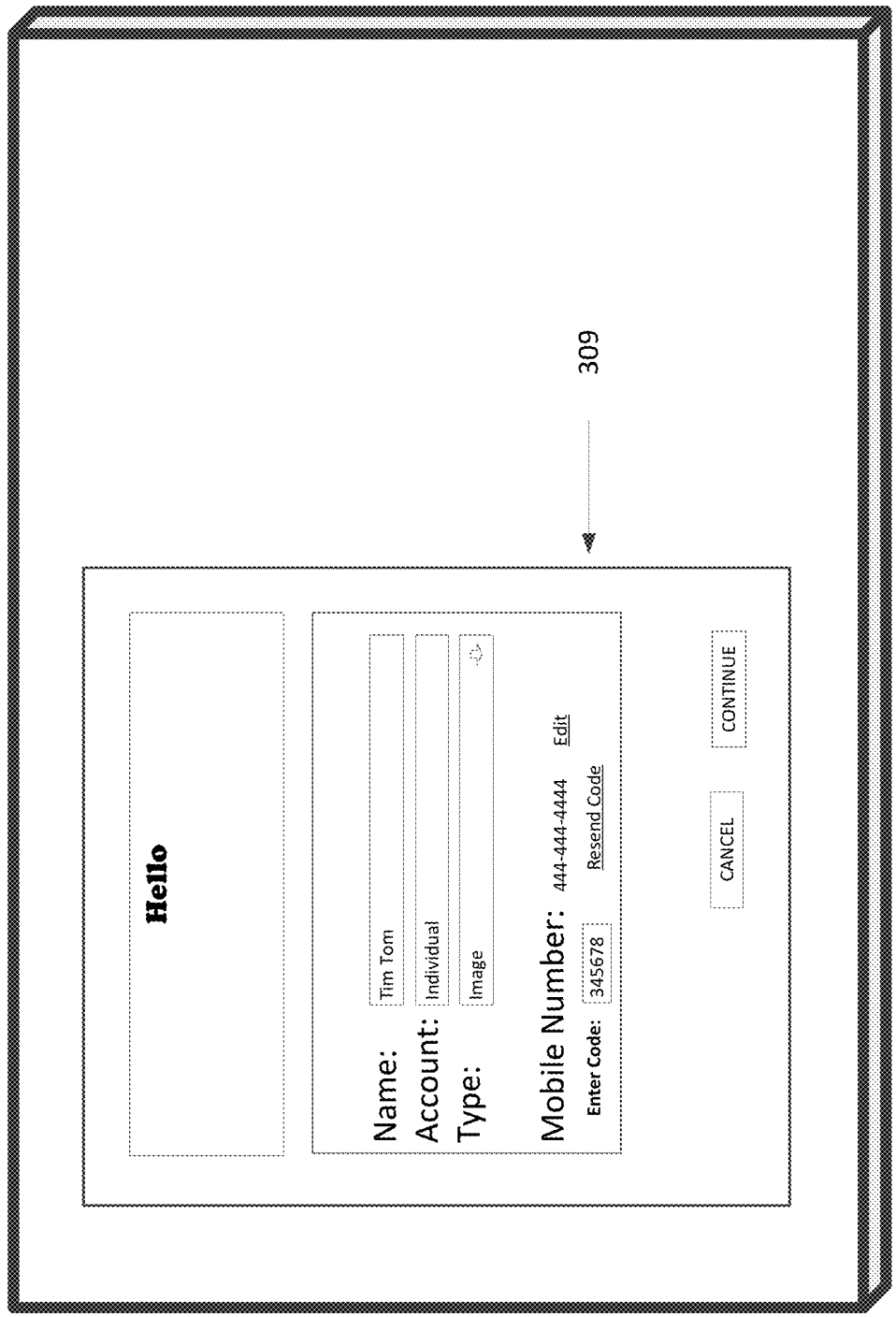
Figure 3D:
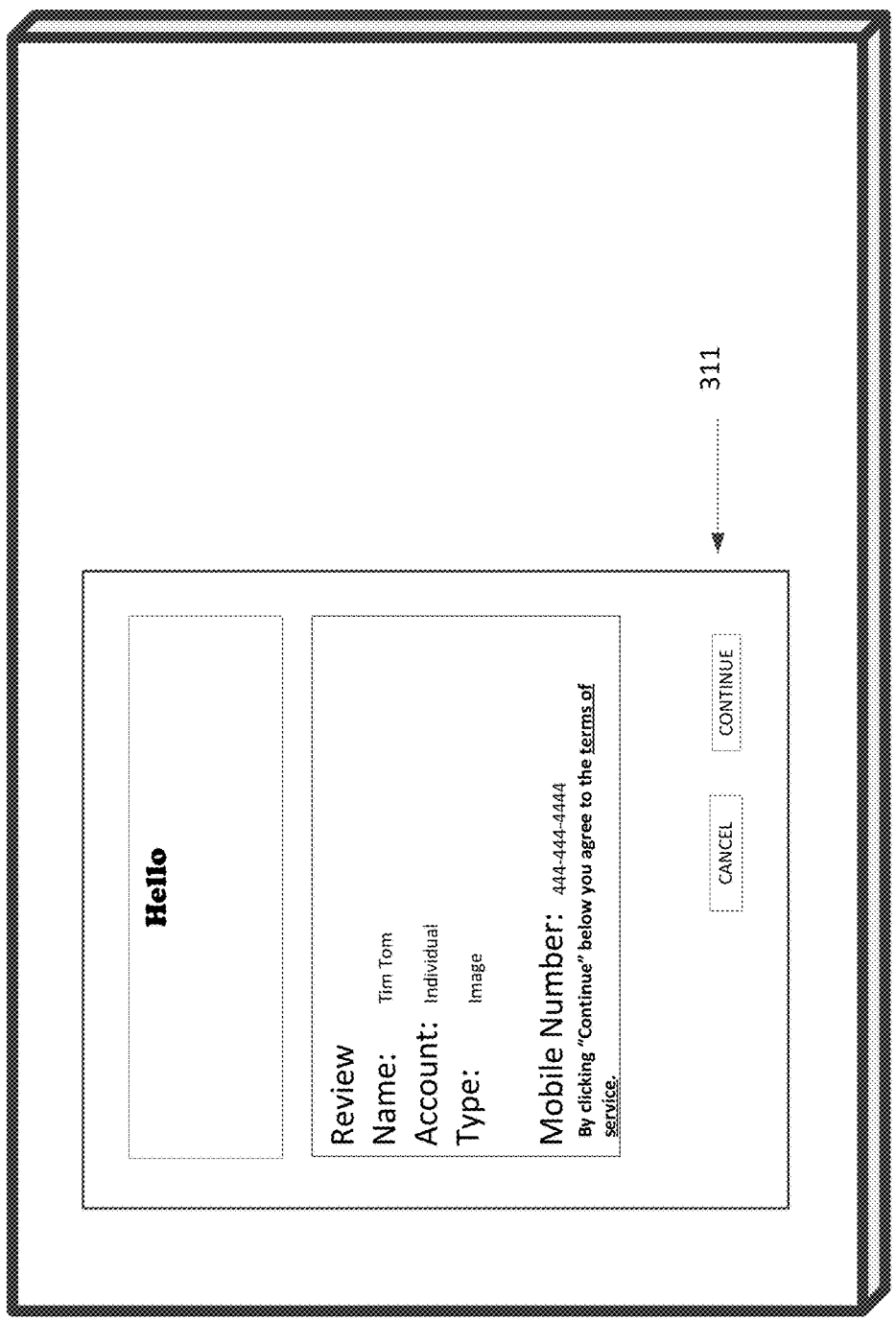

In S201, a user of a non-mobile device 110 may invoke a Web application through a Web browser. The Web application may perform operations in both the server computer system 120 and the non-mobile device 110. At the side of the non-mobile device 110, the Web browser may display a webpage including a hypertext markup language (HTML) form on the display of the non-mobile device 110. An example webpage that includes an HTML form is shown in FIG. 3A. The webpage may include fields 301 for, in S203, entry of specific initial information related to a task. The webpage may include a choice field 303 indicating an option of obtaining information in the webpage of an image of a particular printed document. For example, the webpage may offer the option of obtaining a payment by check. The check may be handled by simply taking a picture of the check. In S205, upon selecting the option of obtaining an image of a document, such as a check, in S207, the webpage may request input of a mobile number 305 that may be used to send a text message to a mobile device 130. In an exemplary aspect, the mobile device 130 is a device for use by the same user of the non-mobile device 110. FIG. 3B shows the webpage with the mobile number entered in the respective field 307. In an exemplary aspect, in S209, the server system 120 may send a confirmation message to the mobile device 130 to verify, in S211, the connection made using the mobile number. FIG. 3C shows an example of entry of a confirmation code in field 309. FIG. 3D shows an example 311 of initiating the operation of obtaining an image of a document, for example a check.

Figure 3E:
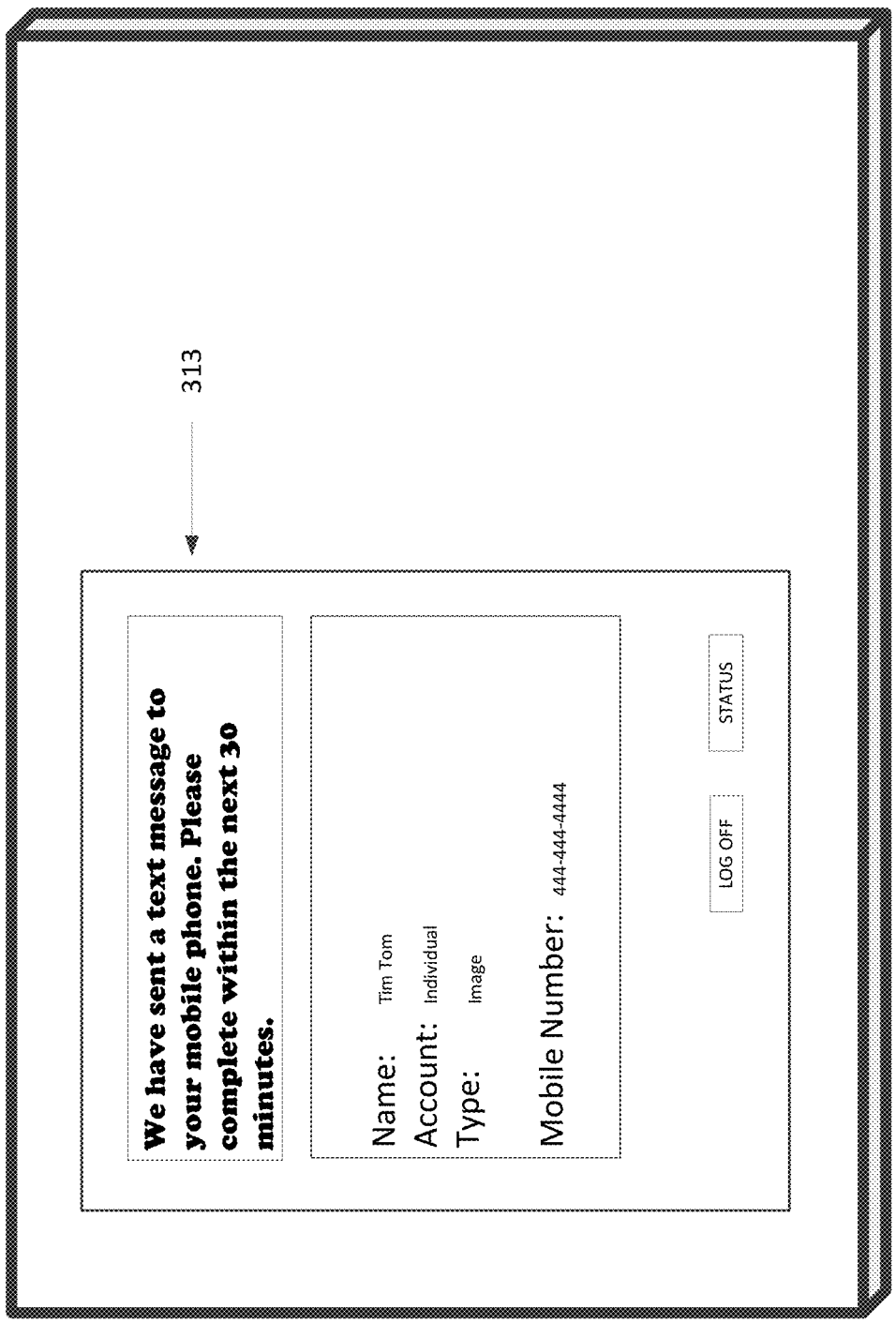
Figure 3F:
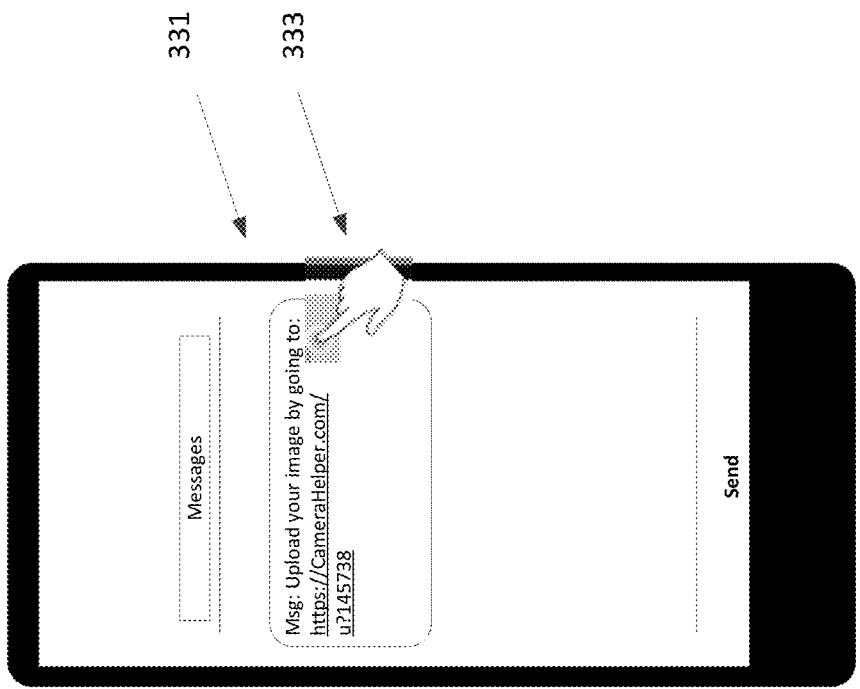

In an exemplary aspect, in S213, the Web application may set a time limit for responding with performance of operation on the side of the mobile device 130. FIG. 3E shows an example of a message 313 that may be displayed at the display of the non-mobile device 110 indicating a timeout period. In S221 the server system 120 will generate a text message including a uniquely parameterized hyperlink, and in S223, the text message will be transmitted to the mobile device 130. In this disclosure, the uniquely parameterized hyperlink is generated in the server system 120 and provides a uniform resource locator (URL) for a microapplication and includes at least one validation parameter for initiating communication with the mobile device 130. Note that in one embodiment the microapplication is generated by the Web application at server system 120. The parameterized hyperlink may be considered as unique as the hyperlink and one or more parameters pertain to a specific instance of the microapplication. In S225, as shown in FIG. 3F, the message 331 will be displayed on the mobile device 130. In S227, the hyperlink 333 may be activated to bring up a Web browser on the mobile device 130. In S229, the URL and verification parameter are sent to the server system 120, which establishes a path to the Web application such that both the non-mobile device 110 and the mobile device 130 may interact.

Figure 3H:
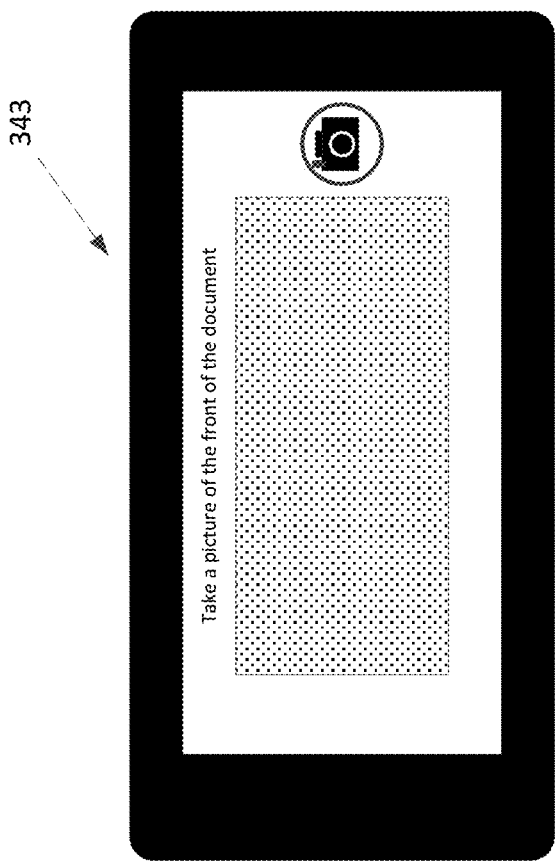
Figure 3G:
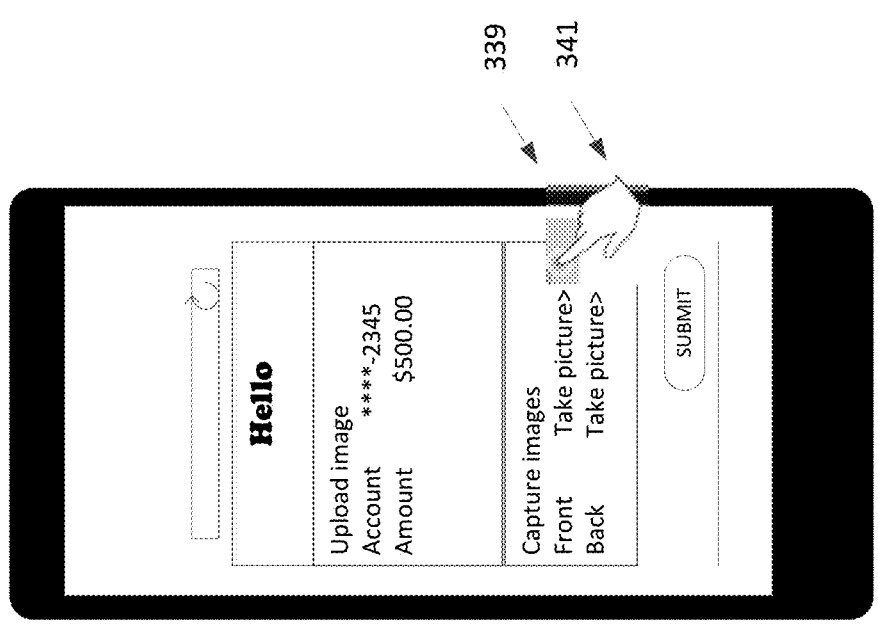
Figure 3J:
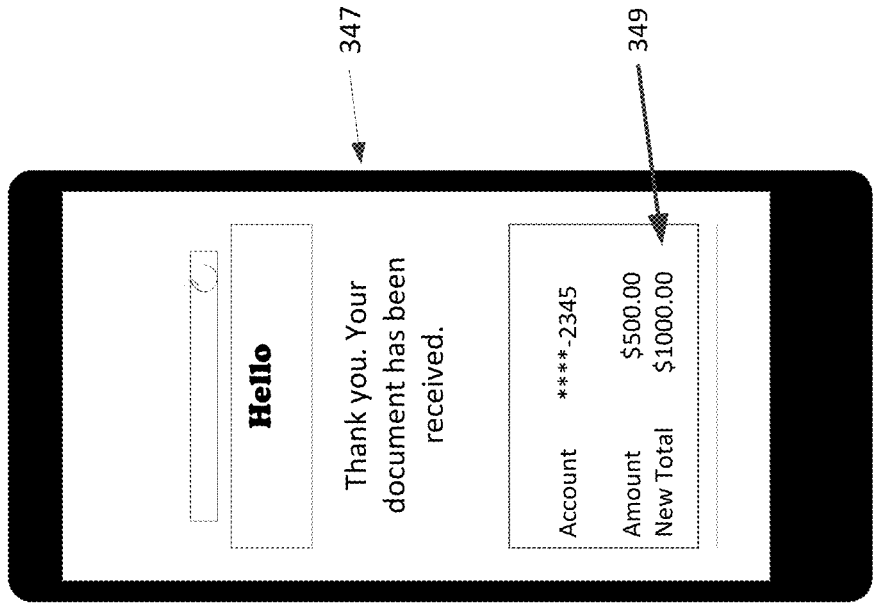
Figure 3I:
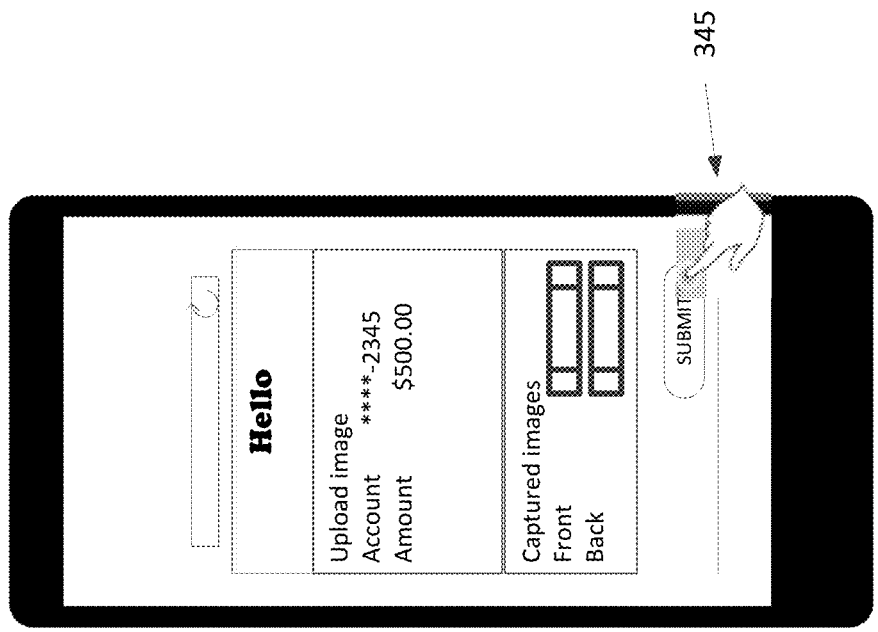

If a time limit is set by the Web application, in S215, a check will be made by the server system 120 to determine whether the timeout period has expired. In S231, in the case that the timeout period has not expired (NO in S215), the server system 120 will assemble the microapplication and send it downstream to the mobile device 130. The microapplication may invoke the camera function of the mobile device 130. FIG. 3G shows an example of displaying an option 339 for invoking the camera function on the mobile device 130. In S233, the option for invoking the camera function may be selected 341. As shown in FIG. 3H, in S235, the camera function may be activated. In S237, the camera function 343 may be performed to obtain an image of a specific document, for example a check. As shown in FIG. 3I, in S239, the captured image of the document may be submitted 345 for uploading to the server system 120 using the Web application. In S241, the task initiated on the non-mobile device 110 may be completed upon transferring the uploaded image. As shown in FIG. 3J, in S243, a message confirming completion of the task 347 may be sent to the mobile device 130. In an exemplary aspect, the message confirming completion of the task may reflect an updated amount 349 in a database maintained in the server system 120.

Figure 3K:

In the case that the timeout period has expired (YES in S215), as shown in FIG. 3K, a message may be sent to the mobile device 130 informing of the timeout. In S253, the server system 120 may shut down the connection with the mobile device 130 (i.e., the process would be ended without having been completed).

The above example embodiment allows for an option of completing an on-line transaction by submitting a check. The transaction can be performed with the aid of the camera function of the mobile device 130 without having to obtain an app from an app store and determine how to use it for the task at hand. The process of taking a picture of a check and submitting it for payment is streamlined such that all that is required is to take a picture of the check. The microapplication and server system 120 handle processing of the check, such as submission of the check image to a linked website, validating the check, posting the check as a payment, sending out payment verification. The user does not need to know the address of the website to submit the check. The check does not have to be manually handled in order to post a payment amount to a particular account. Instead, the server system 120 handles processing of the check and posting a payment. Capturing the image of the check is the only step that is necessary to complete the transaction.

In one or more embodiments, a one-and-the-same relationship between a process in a mobile channel and a process in a non-mobile channel may be established by way of a uniquely parameterized hyperlink that is sent by text message to the mobile device to create a path for contemporaneous or sequential communication. When the user taps the link on the mobile device, a web browser may be invoked. Sending a uniquely parameterized hyperlink via text messaging enables instantiation of a contextually informed microapplication in the mobile device and downloaded from a source at an embedded link. In this disclosure, a contextually informed microapplication may be a Web application that is executed in a browser of a mobile device for performing of a specialized function. In some embodiments, the microapplication may be a program that is processed in another installed app of the mobile device 130, such as a messaging app or an e-mail client app (for example, an e-mail application native to the mobile device 130 or an e-mail application that can be downloaded from, for example, an app store). As will be discussed in examples to follow, the specialized function is a function of the mobile device 130, such as taking pictures, touch, determining its location. The microapplication may be implemented in a programming language such as Javascript, Active Server Pages, Java Applets, or the like.

A one-and-the-same relationship between the mobile microapplication (in the mobile channel) and the non-mobile channel is established when the microapplication is instantiated. In other words, when the microapplication is instantiated, it is informed by the Web application of the context being performed at the non-mobile device 110 and a communication path is established so that results of actions performed using functions of the mobile device 130 are reflected back to the non-mobile device 110 providing an arrangement that the combination of non-mobile device 110 and functions of the mobile device 130 allow a task to be completed in a contemporaneous and streamlined fashion. In some embodiments, values included with the microapplication can be portions of content extracted from the content displayed by the Web application. For example, the microapplication may include values extracted from a form displayed by the Web application. The microapplication may include values retrieved from a backend database that is accessed by the server system 120. The microapplication may include values temporarily stored in the server system 120 in association with the instance of the Web application.

FIG. 4 is a sequence diagram illustrating establishment of a one-and-the same relationship between a process in a mobile channel and a process in a non-mobile channel by way of at least one server system 120. In S411, a process may be initiated in a non-mobile device 110. For example, a Web browser may be invoked on a desktop computer and used to bring up a Web application. The Web application may be one that enables interaction between the desktop computer and the server system 120 and establishes a non-mobile channel. Also, backend functions such as a database system may be accessed through the Web application. In S413, a mobile number for sending a text message may be entered into the Web application. In S415, the Web application may perform an operation to use the mobile number to have a message transmitted that includes a uniquely parameterized hyperlink that will only be used for a specific session with another device, such as a mobile device 130. The Web application may then, in S417, send the message that includes the uniquely parameterized URL to the mobile device 130 using the mobile number.

In S419, the mobile device 130 receives the text message containing the uniquely parameterized hyperlink. The mobile device 130 can display the text message using any installed messaging app. The parameterized hyperlink includes a URL and at least one parameter. The displayed URL represents a link to an IP address. The URL can be activated by tapping on the screen at the location of the displayed URL. Any pointing device, or displayed pointer, may be used to select the URL for activation by the mobile device 130. Activation generally involves using Internet protocols for transmitting the URL to the appropriate address. Activating the URL will establish a communication path for communication between the mobile device 130 and the server system 120, and in S421, may invoke a Web browser on the mobile device 130, or an app that is capable of processing code transmitted by the server system 120. In S423, the mobile device 130 may extract the parameter and return a message including a verification code to the server system 120. In an exemplary aspect, the verification code is generated based on a parameter value included in the uniquely parameterized hyperlink.

In S425, the server system 120 may verify the verification code and temporality handoff control to the mobile channel 130. Once control has been handed off to the mobile channel, in S427, the Web browser, or mobile app, running on the mobile device 130, may invoke mobile device 130 native functions. By doing so, in S429, the functions of the mobile device 130 are made available in the non-mobile device 110 through the relationship coordinated by the server system 120. In S431, actions of the mobile device 130 may be reflected on the display of the non-mobile device 110. Actions of the mobile device 130 are performed by way of functions that the mobile device 130 can perform, such as taking pictures and receiving touch input. Various non-limiting examples of the one-and-the-same relationship are described with respect to the following drawings.

Figure 5A:
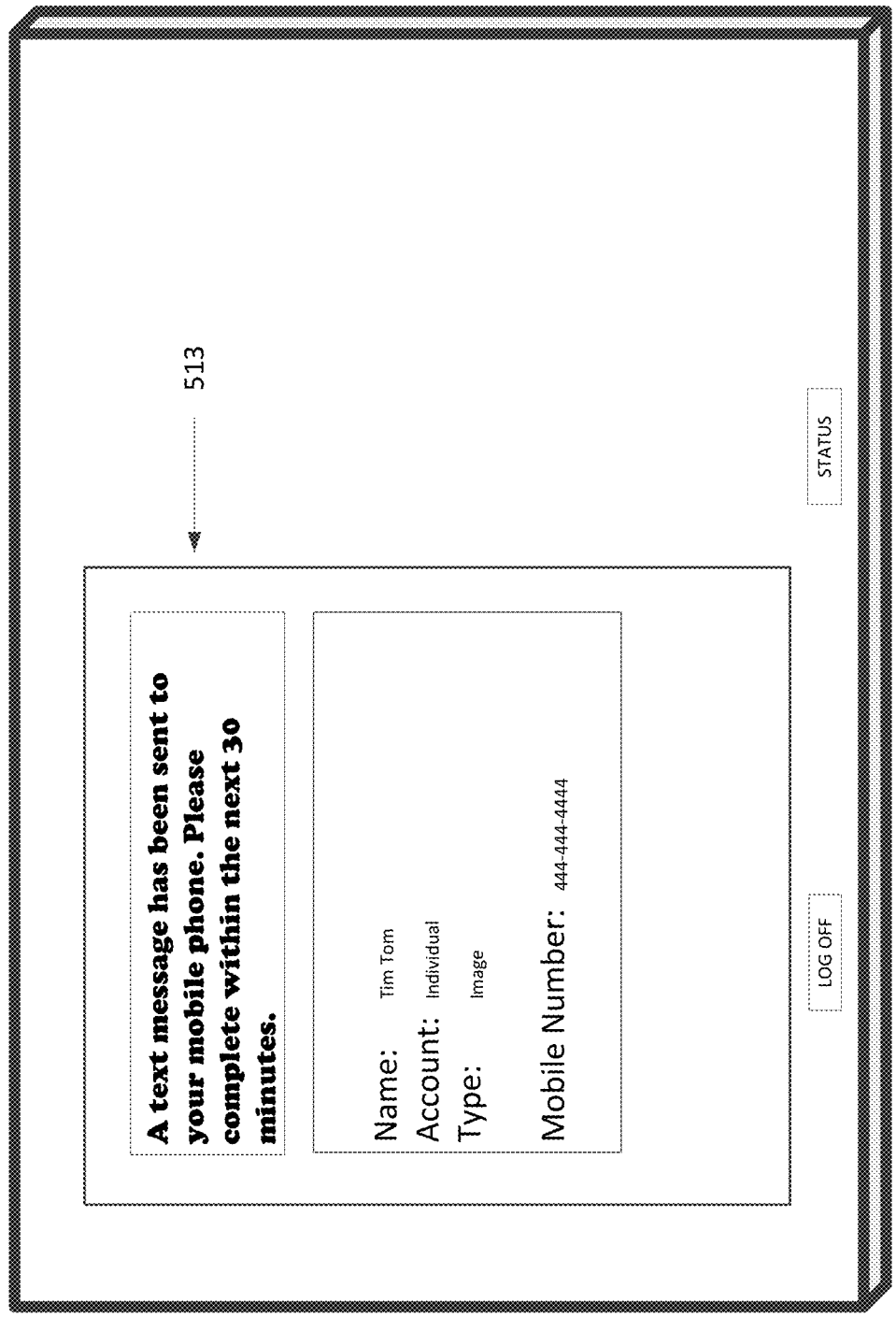
FIGS. 5A to 5F show example displays for a process of establishing a one-and-the-same relationship between a mobile device's camera function and a non-mobile device according to an exemplary aspect of the disclosure.
Figure 5B:
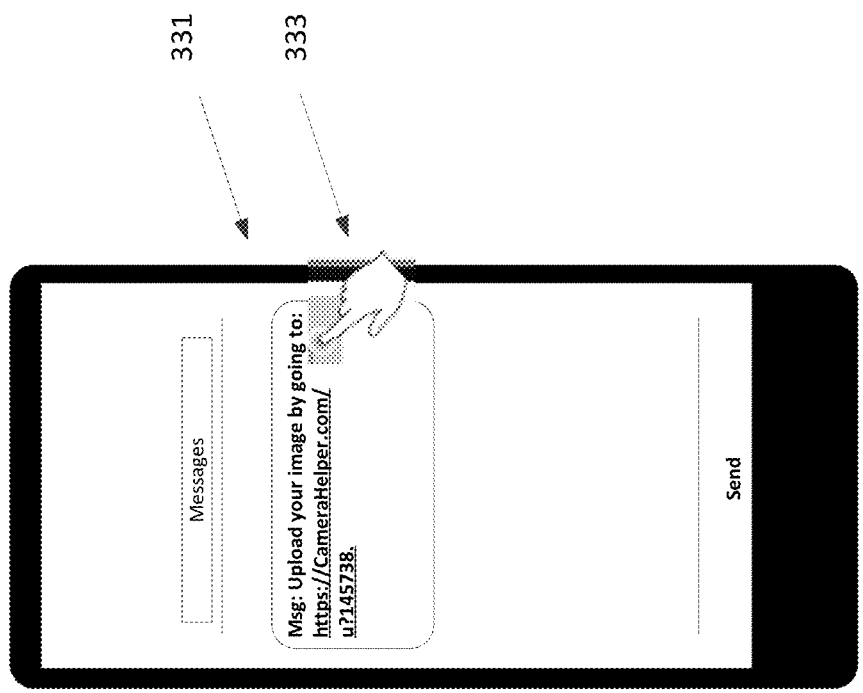
Figures 5C, 5D:
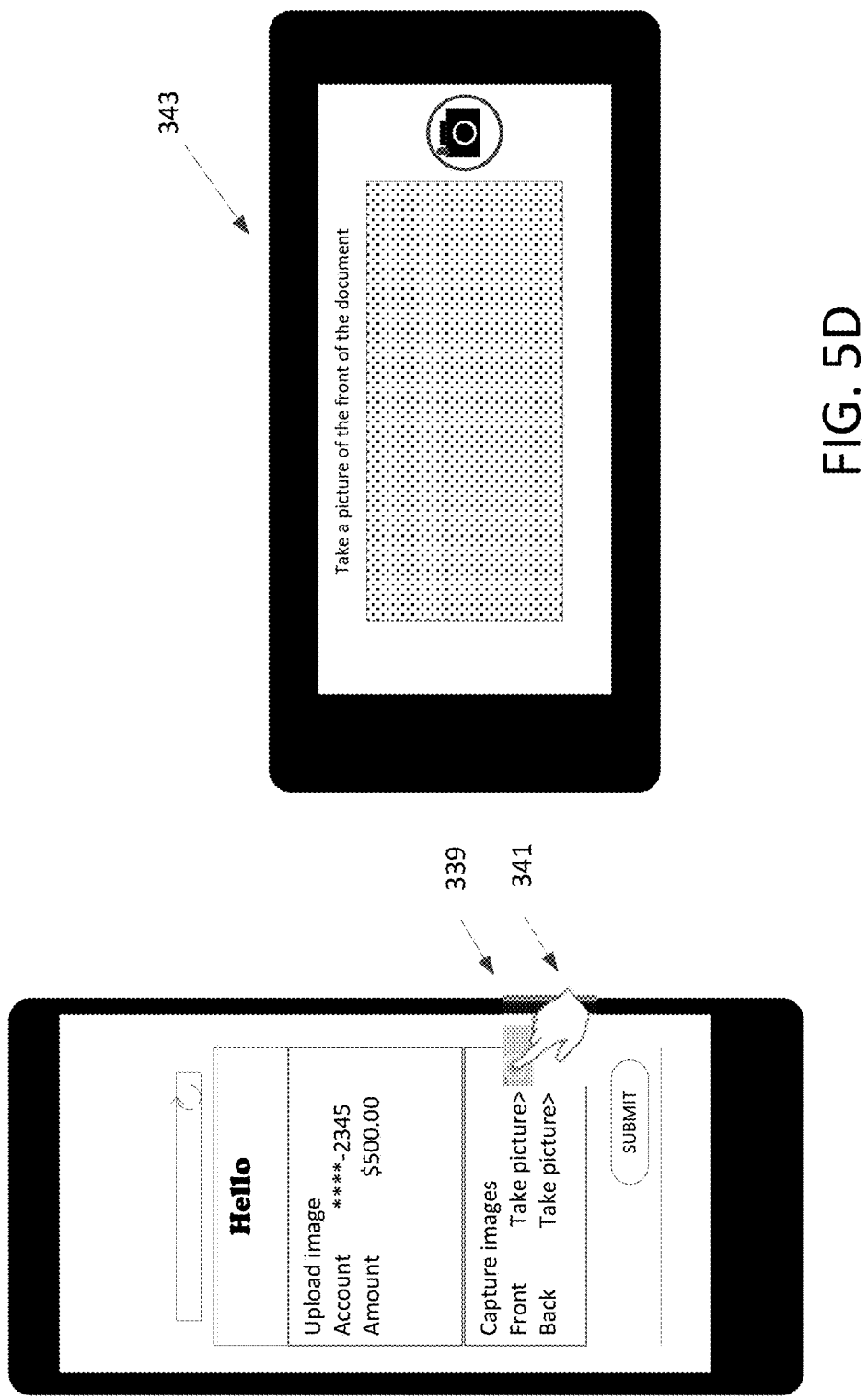
Figure 5E:
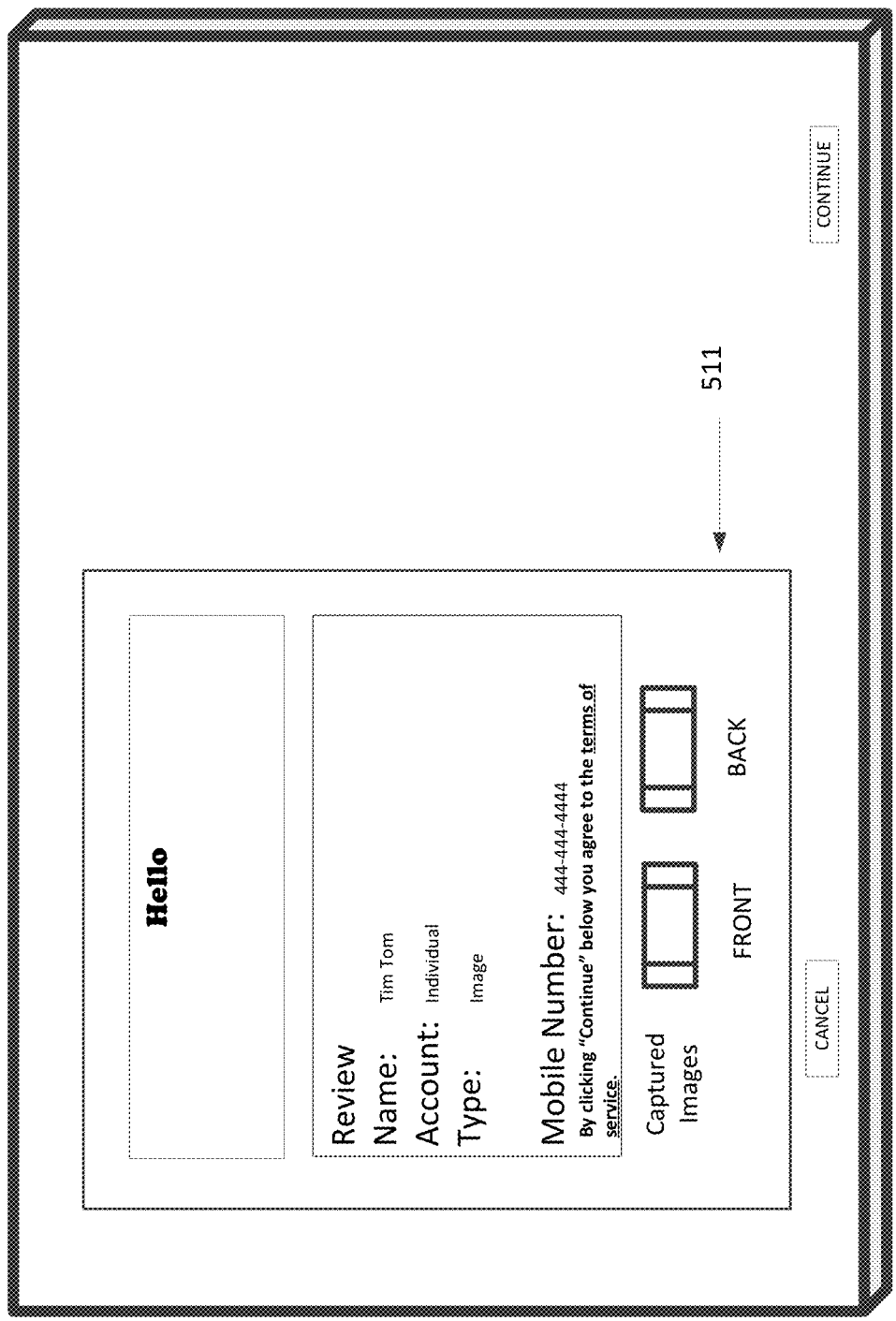
Figure 5F:
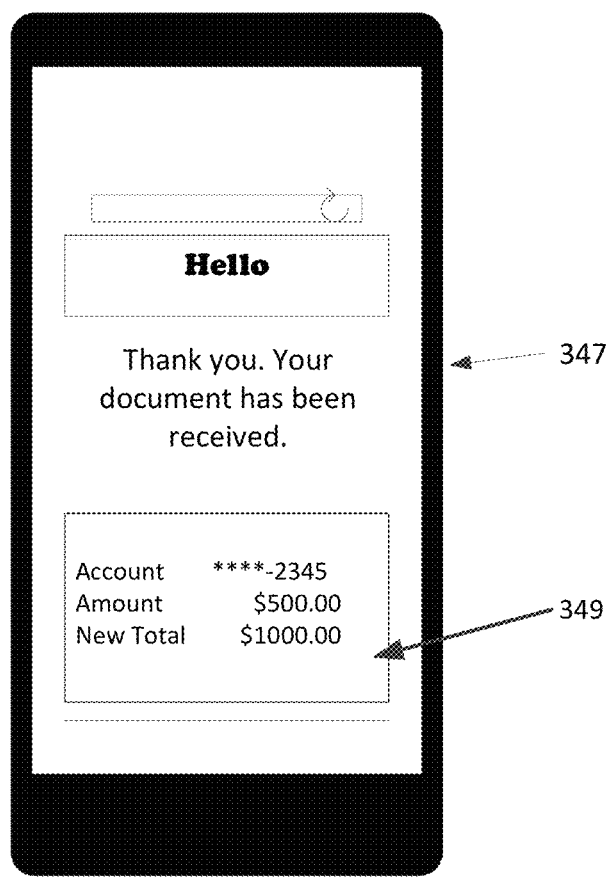

FIGS. 5A to 5F show example displays for a process of establishing a one-and-the-same relationship between a mobile device's camera function and a non-mobile device according to an exemplary aspect of the disclosure. In a similar manner as in the process of FIG. 3A to 3D, the process begins with bringing up a Web application on a non-mobile device 110 that provides an option of supplying a mobile number in order to send out a text message. As shown in FIG. 5A, in response to submitting a mobile number, a notice 513 will be displayed on a display of the non-mobile device 110 to indicate that a text message has been sent to the mobile device 130. The mobile number is submitted to the server system 120 along with other information supplied by the Web application. The server system 120 may use a messaging service to generate a text message to be sent to the mobile device 130 via the mobile number. As shown in FIG. 5B, the text message 331 is received and displayed in a message function of the mobile device 130. The text message 331 includes a parameterized hyperlink. The hyperlink can be activated by selecting the hyperlink 333. As shown in FIG. 5C, activating the hyperlink invokes a microapplication that performs a unique action using the mobile device's camera function. As shown in FIG. 5C, the microapplication may populate a display of the mobile device 130 with information that is displayed/entered at the non-mobile device 110, such as a name, an address, an account, and an amount (and/or any other information associated with the user/form/task being performed at the non-mobile device 110). Access to the camera function may be through a button 339, which when selected 341, brings up an interface for image capture, as shown in FIG. 5D. The interface may include instructions for capturing an image 343.

In the case of the embodiment in FIG. 5, a one-and-the-same relationship has been established between the non-mobile device 110 and the mobile device 130. The relationship is established by way of a communication pathway within the server system 120 such that actions performed using a function of the mobile device 130 are automatically communicated back to the non-mobile device 110. As shown in FIG. 5E, images captured using the camera function of the mobile device 130 may be immediately forwarded via the server system 120 for display on the display of the non-mobile device 110 at a position 511 determined by the Web application. In an exemplary aspect, the image to be obtained using the function of the mobile device may be previewed on a display of the mobile device 130 before being captured and forwarded, so that the user may insure that the image is of sufficient accuracy. Display of the captured images on the display of the non-mobile device 110 at position 511, constitutes a formal completion of the task that was started in the Web application on the non-mobile device 110. As shown in FIG. 5F, a message 347 confirming completion of the task may be displayed using a Web browser of the mobile device 130 or a screen of a microapplication. The display may also show a result 349 of the task, as verification that the task is completed.

Figure 6A:
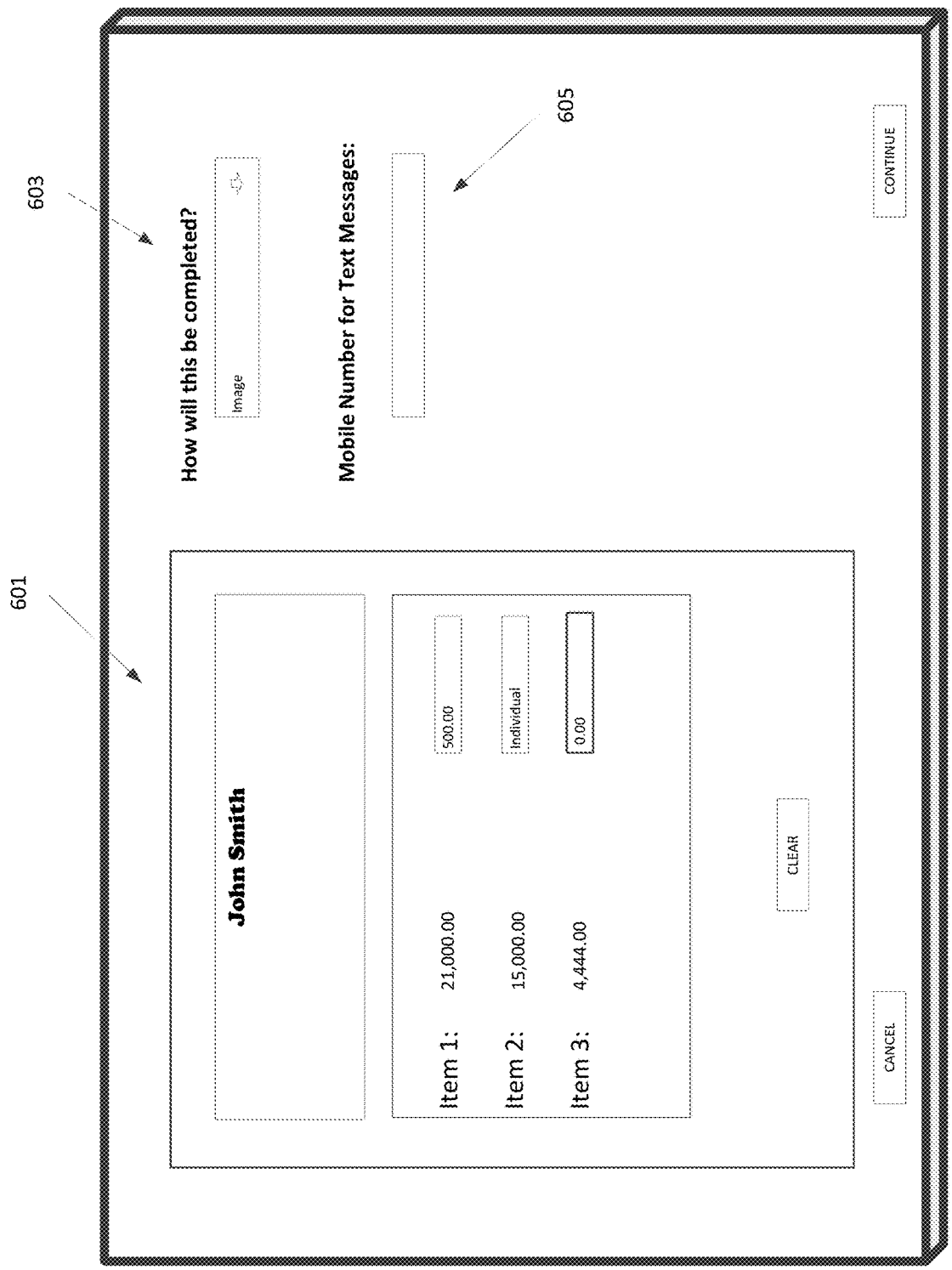
FIGS. 6A to 6E show example displays for a process of extending a mobile device's camera function to a non-mobile device according to an exemplary aspect of the disclosure.
Figure 6D:
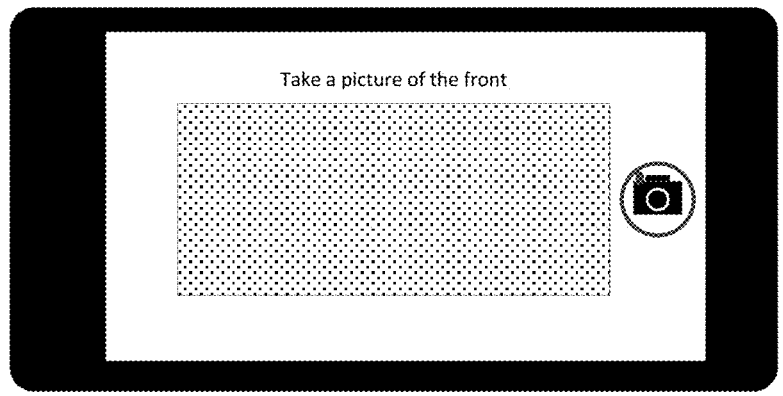
Figure 6C:
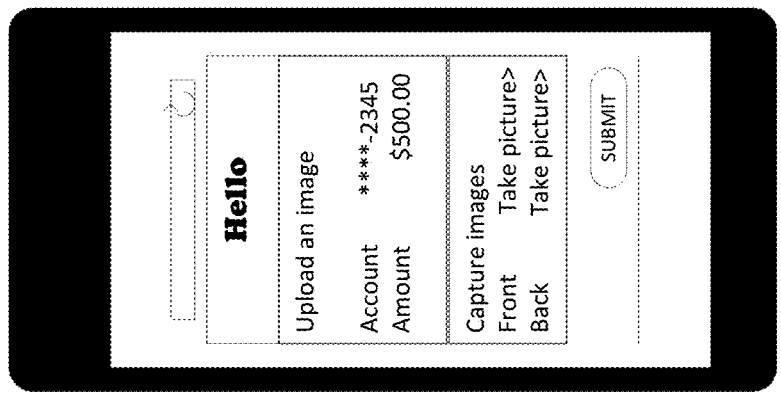
Figure 6B:
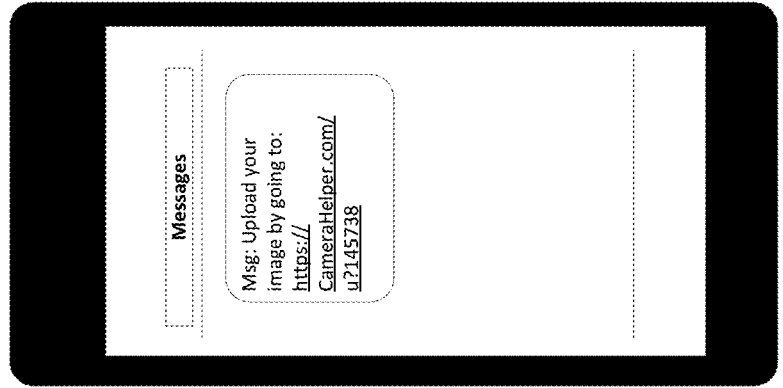
Figure 6E:
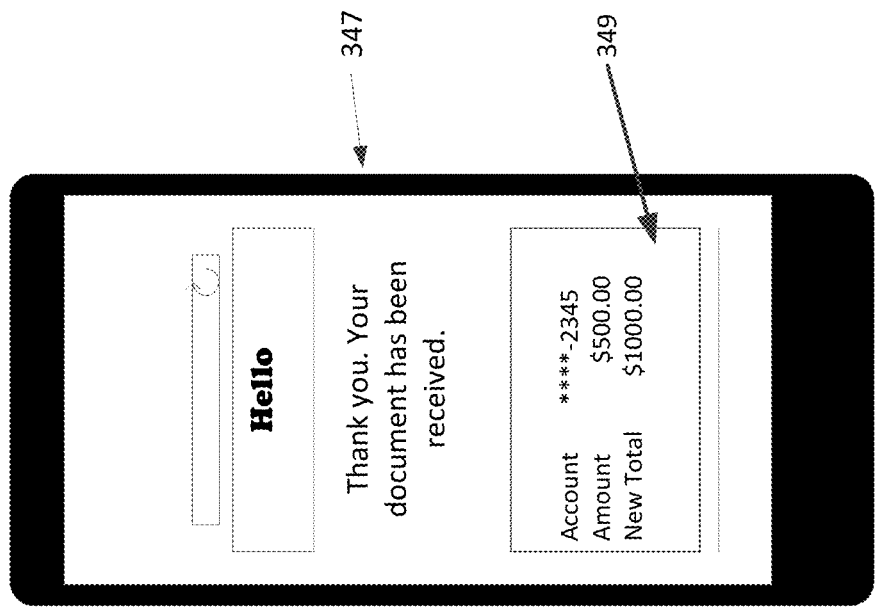

In one embodiment, the camera function of a remote mobile device 130 may be used to complete a task being performed on the non-mobile device 110. An exemplary aspect includes using the camera function to capture an image that enables completion of a task with a user of the non-mobile device 110. FIGS. 6A, 6B, 6C, 6D, 6E show example displays for another process of extending a mobile device's camera function to a non-mobile device according to an exemplary aspect of the disclosure. In the example, as also discussed above, a check image 601 may be uploaded in a remote mobile device 130 to complete a task initiated on a Web application. Example documents may include a check, a birth certificate, driver's license, social security card, or facial photograph. One example embodiment may be for performing a task that includes a transaction requiring payment by check. This can be started on a website at the non-mobile device 110, and then an image of the check is captured via the mobile phone 130 and transmitted to the server system 120, which in turn transmits it to the non-mobile device 110 thereby completing the task. As shown in FIG. 6A, a webpage including an HTML form 601 may be displayed on the display of the non-mobile device 110, and the webpage that includes the HTML form 601 may include an option 603 to obtain an image of a document. The webpage may include a field 605 to enter a mobile number for sending a text message. As shown in FIG. 6B, a text message is sent from the website to the mobile device containing a uniquely parameterized link to a microapplication. In FIG. 6C, the user may be instructed by the microapplication to upload images of a document using the mobile device's built-in camera. In FIG. 6D, the camera may be used to capture an image of a specific document. Upon submitting the image of the document, as shown in FIG. 6E, a message 347 may be sent to the mobile device 130 to indicate that the task may be completed. The mobile device 130 may also receive information 349 that serves to verify that the task has been completed.

This may be used to complete a task on the mobile device 130 that was started on the non-mobile device 110. Such task may be to submit a check (as discussed above in detail), to verify identity of a user by providing an image of a user's driver's license, birth certificate, etc., or the like.

FIGS. 7A to 7F show example displays for a process of establishing a one-and-the-same relationship between a mobile device's camera function and a non-mobile device according to an exemplary aspect of the disclosure. In the case of this embodiment, a one-and-the-same relationship has been established between the non-mobile device 110 and the mobile device 130. The relationship is established by way of a communication pathway within the server system 120 such that actions performed using a function of the mobile device 130 are immediately communicated via the server system 120 back to the non-mobile device 110. In the embodiment, when a document image is obtained using a camera function of the mobile device 130, the document image will automatically be displayed on the display of the non-mobile device 110. In the embodiment, a document image 601 may be obtained using a mobile device 130 that is located remotely from the non-mobile device 110 to complete a task initiated on a Web application performed on a non-mobile device 110. As mentioned above, example documents may include a check, a birth certificate, driver's license, social security card, or facial photograph.

In the embodiment a task may be performed with a non-mobile device 110 using a website, in which the task may be completed online using a check. As shown in FIG. 7A, a webpage including a HTML form 601 may be displayed on the display of the non-mobile device 110, and the webpage that includes the HTML form 601 may include an option 603 to obtain an image of the check. The webpage may include a field 605 to enter a mobile number for sending a text message. In an exemplary aspect, the mobile number 605 is sent to the server system 120 which provides a URL of a microapplication and a verification parameter. The server system 120 may make a request to a messaging service to generate a text message including the URL and verification parameter and to send the text message to the mobile device 130 at the mobile number. The server system 120 may pass information extracted from the webpage to a microapplication that will respond to the verification parameter.

Figure 7D:
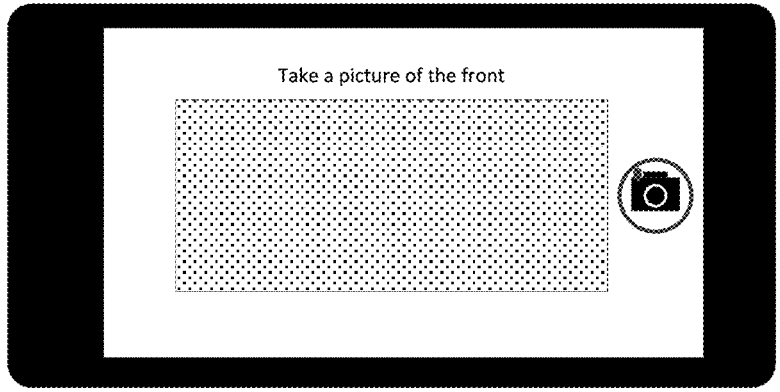
Figure 7C:
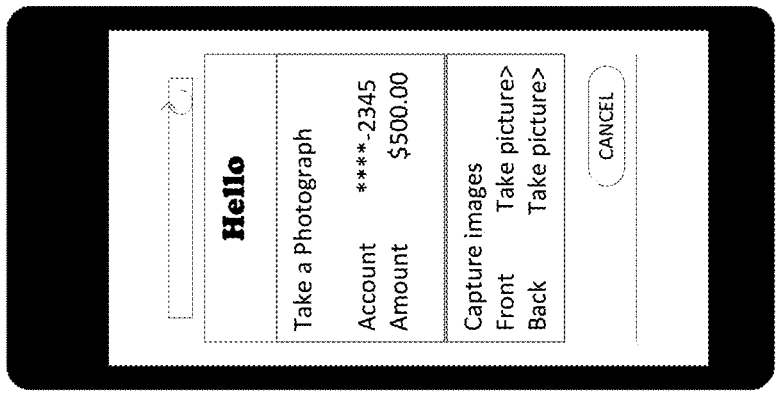
Figure 7B:
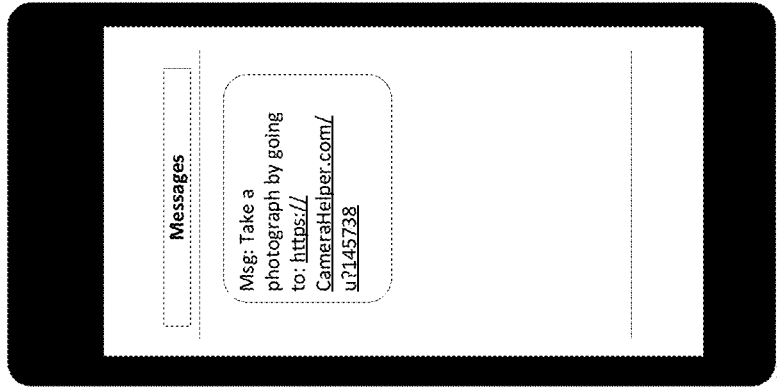
Figure 7E:
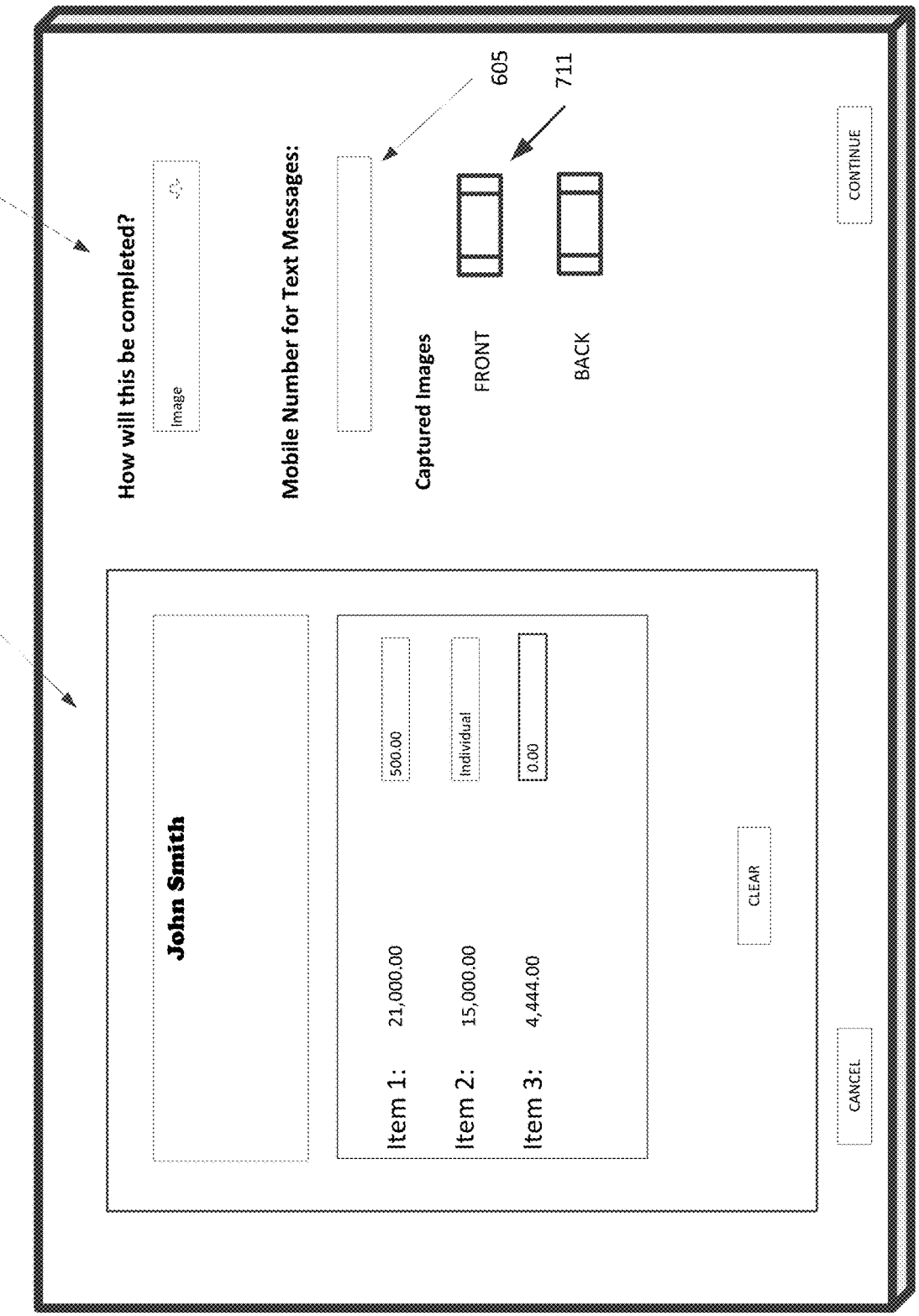
Figure 7F:
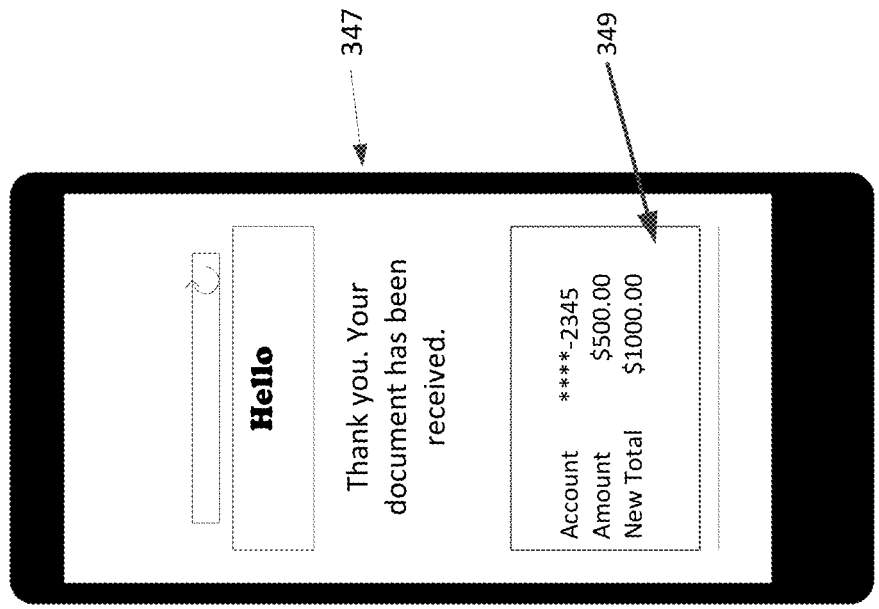

As shown in FIG. 7B, the text message is received from the messaging service, in which the text message contains the uniquely parameterized hyperlink to a microapplication. Upon invoking the microapplication using the verification parameter and uploading to the mobile device 130, in FIG. 7C, the user may be instructed by the microapplication to take a photograph of a check, made out to the amount indicated by the instruction, using the mobile device's built-in camera. The amount and account information was provided with the microapplication. The amount and account information is then populated in the display on the mobile device 130. In FIG. 7D, the built-in camera may be used to capture an image of the check. Upon taking the photograph of the check, as shown in FIG. 7E, images 711 of the check, such as reduced thumbnail images, are instantly displayed using the server system 120 in the display of the non-mobile device 110. In an exemplary aspect, the image of the check captured by the mobile device's camera is sent to the server system 120 and the server system 120 (using an account services server) posts the check as a payment to the account indicated in the Web application. The image of the check sent to the non-mobile device 110 constitutes completion of the task. As shown in FIG. 7F, a message 347 may be displayed on the mobile device 130 to indicate that the check has been received. The mobile device 130 may also receive information 349 that serves to verify that the task has been completed. Note that the receiving of the image of the check does not necessarily mean the entire process/task has been completed. In fact, there may be additional steps of process/task that are to be completed at the non-mobile device 110 once the image of the check has been received from the mobile device 130 via the server system 120.

Figure 8A:
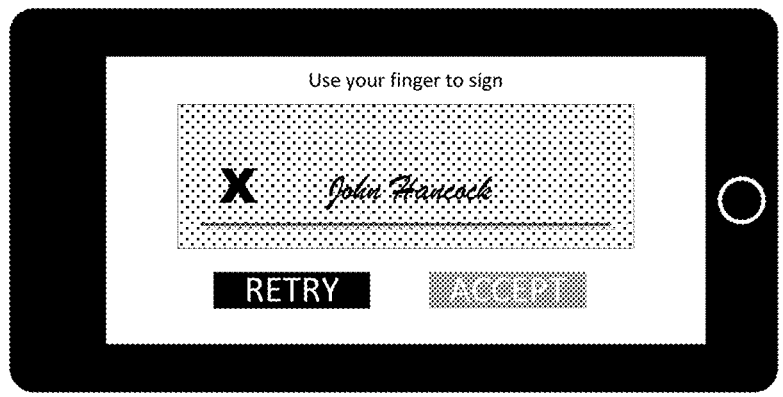
FIGS. 8A, 8B show example displays for a process of extending a mobile device's touchscreen function to a non-mobile device according to an exemplary aspect of the disclosure.
Figure 8B:
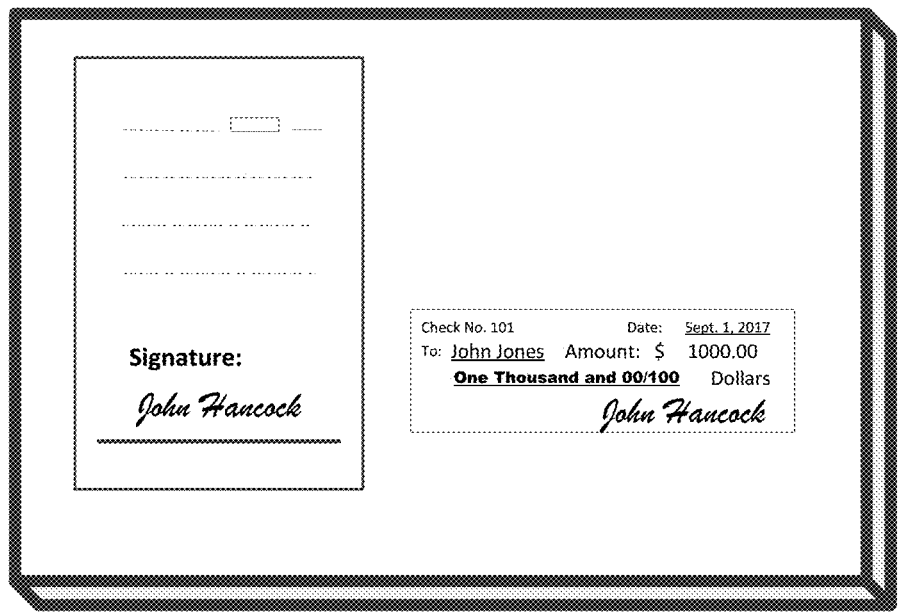

In one embodiment, a signature may be appended to a webpage displayed on a screen of the non-mobile device 110 to complete a task initiated on a Web application. The signature may be used for authentication, wherein when the user enters a username using the non-mobile device 110, a website that is being handled by a browser of the non-mobile device 110 sends a text message to a previously authenticated mobile number on file. FIGS. 8A, 8B show example displays for a process of extending a mobile device's 130 touchscreen function to a non-mobile device 110 according to an exemplary aspect of the disclosure. If the user initiates a process or task on a non-mobile website that requires a personal signature, the website asks the user for a mobile texting number or may populate the display with an editable mobile number on file. An example process or task that may require a signature may include a document that is being prepared or displayed on the screen of the non-mobile device 110, or a webpage that is being completed using the non-mobile website. The server system 120 may generate a text message using a messaging service, in which the message includes a URL of a service that will handle the signature microapplication that includes data related to the task. The text message is sent to the mobile number and contains a parameterized hyperlink to the signature microapplication, which when invoked, allows the user to sign using the mobile device's 130 touchscreen. In FIG. 8A, upon the user's acceptance of the image of the signature, the signature is then uploaded to the website and, in FIG. 8B, displayed on a screen of the non-mobile device 110 at a predetermined position. As can be seen in FIG. 8B, in an exemplary aspect, both a check and the signature may be uploaded to the website and displayed on a screen of the non-mobile device 110 to complete a task.

Figure 9A:
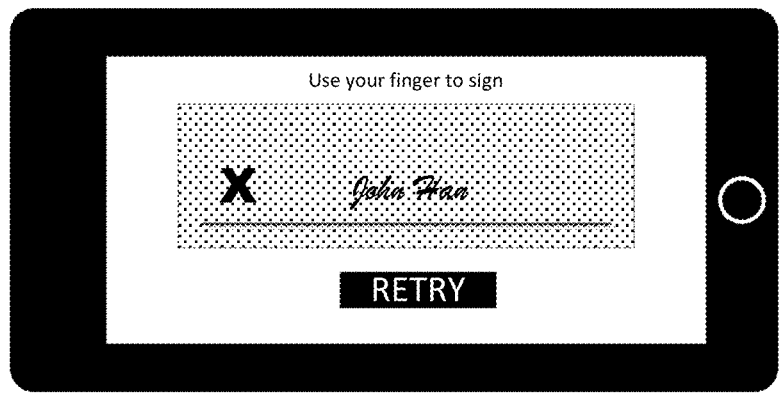
FIGS. 9A, 9B show example displays for a process of establishing a one-and-the-same relationship between a mobile device's touchscreen function and a non-mobile device according to an exemplary aspect of the disclosure.
Figure 9B:
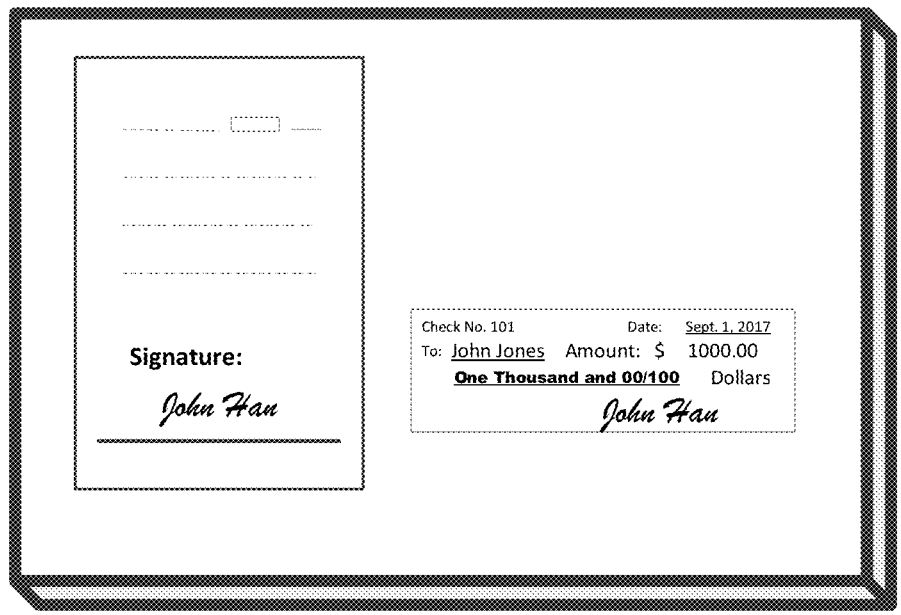

FIGS. 9A, 9B show example displays for a process of establishing a one-and-the-same relationship between a mobile device's touchscreen function and a non-mobile device according to an exemplary aspect of the disclosure. In the case of this embodiment, a communication path has been established between the non-mobile device 110 and the mobile device 130. The relationship is established by way of a communication pathway within the server system 120 such that actions performed using a function of the mobile device 130 are incrementally transmitted back to the non-mobile device 110. In an exemplary aspect, the microapplication may transmit a predetermined number of pixels, such as up to every 10 pixels, of the user's touch on the touchscreen of the mobile device 130. In the embodiment, as shown in FIG. 9A, as a user is signing using the mobile device's touchscreen, as shown in FIG. 9B, the signature is instantly partially displayed every predetermined number of pixels on the display of the non-mobile device 110. By displaying a few pixels of a signature at a time on the display of the non-mobile device 110 while the user is entering the signature in the mobile device 130, the user is able to use the touch screen of the mobile device 130 as though it is a real-time input device for the non-mobile device 110. Also, the user is able to verify entry of the signature in the non-mobile device 110 as it is being entered in the mobile device 130 without having to first enter a signature on one device and then submit the completed signature to the other device.

Note that the predetermined number of pixels discussed above is not limited to every 10 pixels, but may be every 5 pixels, 15 pixels, 20 pixels, etc. Furthermore, this predetermined number of pixels may vary based on the particular content. For example, if a user's initials are to be entered via the touchscreen of the mobile device 130, the server system 120 may determine and request that the microapplication/mobile device 130 transmit the user's touch every 5 pixels. This is due to the fact that initials are typically shorter (less characters) than a signature would be. Likewise, if a particular user has a lengthy name (and thus likely a lengthy signature), the system server 120 would take this into account and adjust the predetermined number of pixels accordingly.

Thus, to ensure a seamless/real-time feel for the user entering his/her initials, the back-and-forth communication between the devices is performed at shorter intervals (5 pixels). Hence, as a result, the user entering his/her initials on the mobile device 130 would be able to observe this input seamlessly/in real-time on the non-mobile device 110. Thus, the non-mobile device 110 is able to display, for example, each stroke of the initials as the user is entering them on the mobile device 130.

In one embodiment, the microapplication may send data upstream at predetermined intervals (for example, every 500 milliseconds) following idle activity and before a pixel count threshold has been reached. The user may then hit a clear button on the mobile screen to immediately remove the signature from the web application if his/her signature is unsatisfactory. In one embodiment, a user could hit an accept button and end the interaction. In one embodiment, the server system 120 could send a command downstream to close the microapplication once the user has moved on in the web application.

In one embodiment, the server system 120 may perform a signature-comparison process as the signature is being input via the mobile device 130 (and received by the server system 120). The signature-comparison process may be performed by comparing known signatures of the user (for example, signatures from documents the user has previously signed that may be stored on (or accessed by) the server system 120). Before starting the signature-comparison process, the server system 120 may wait until the full signature has been received.

In one embodiment, the server system 120 may wait to receive a predetermined number of strokes (or pixels) of the signature (thereby starting the process before a full signature is received). For example, the server system 120 may determine that since the user has a lengthy name, a lengthy signature is likely to be expected. The server system 120, in turn, would set the predetermined number of pixels to be, for example, 20 pixels (i.e., receive the signature every 20 pixels as the user is inputting it via the mobile device 130). However, 20 pixels of a signature may not be enough to perform a signature-comparison process. Thus, the server system 120 may set the signature-comparison process to commence after 60 pixels have been received or after enough of the expected signature has been received to distinguish this signature from others.

In one embodiment, the server system 120 may dictate when to commence the signature-comparison process based on past knowledge of the particular user's signature. For example, the server system 120 may determine that this particular user has a distinguishing first letter/character of his/her signature. Such distinguishing mark may be enough for a comparison process with a known signature to determine whether the signatures match (within a certain threshold of error). Hence, in this case, the server system 120 may commence the signature-comparison process once the first letter/character of the signature has been input and sent from the mobile device 130. Once this distinguishing letter/character has been matched to a known existing signature of the user, the server system 120 may determine that the signature is most likely authentic and then perform a "quicker" process for the remaining parts of the signature to confirm the first determination (or omit such "quicker" process and confirm a match based on the distinguishing letter/character). Of course, in one embodiment, such distinguishing letter/character of a signature may be in the middle or at the end of the signature and the server system 120 would then perform the comparison after more pieces of the signature has been received.

In one embodiment, once the signature has been determined to be authentic by the server system, 120, the server system 120 may send a confirmation to the mobile device 130 (or to both the mobile device 130 and the non-mobile device 110). In one embodiment, the server system 120 may not present another task or confirm that the task/process has been completed until the signature has been authenticated.

In one embodiment, if the server system 120 determines that the input signature does not correspond to a known signature (i.e., signature is not authenticated), the server system 120 may send additional instructions to the mobile device 130 instructing that a new signature is required or may ask for particular biometric(s), image(s) password(s), or the like to determine that the user is who he/she claims to be. Once this is established, the server system 120 may determine that although the signatures do not match within the required threshold, the signature is likely authentic. This accounts for the fact that signatures from the same individual may vary through time and it is entirely possible that the signature is authentic although it is not actually identical (within the threshold) to a known previous signature. This provides the advantage of not prematurely ending a task/process simply because a signature is not identical to a known signature, by employing other measures of determining authenticity (i.e., biometric(s), image(s), password(s), or the like).

In one embodiment, if the signature is not authenticated and if the biometric(s), image(s), password(s), or the like also do not match those known of the user, then the server system 120 may make the determination that the user is indeed not the person he/she claims to be (user is not authenticated). Hence, in such situation, the server system 120 may end the task/process, notify the mobile device 130 and/or the non-mobile device 110 that the signature/authentication failed, block the user for a certain period of time due to the detection of possible fraud, maintain a record of the occurrence to determine if in the future the same person attempts this again, or the like.

Figure 10A:
FIGS. 10A to 10C show example displays for a process of extending a mobile device's search function to a non-mobile device according to an exemplary aspect of the disclosure.
Figure 10B:
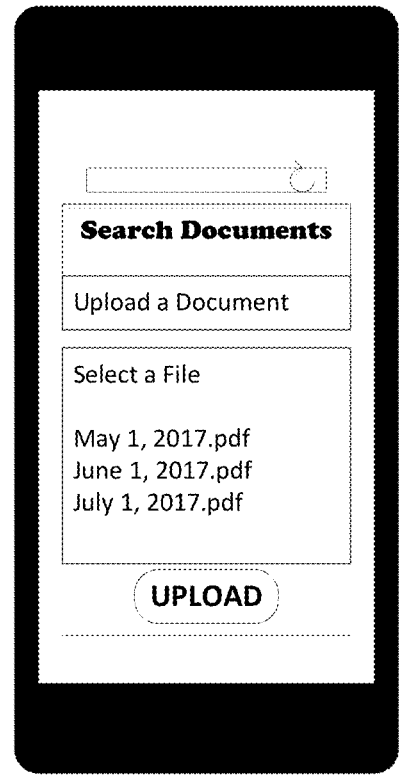
Figure 10C:
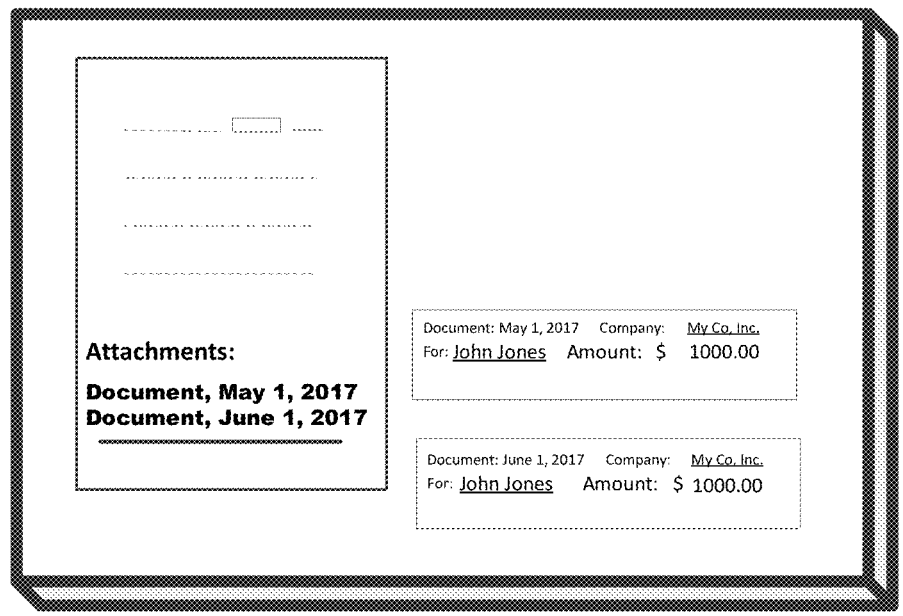

In one embodiment, one or more attachments available from a mobile device may be incorporated as attachments to a document or webpage being processed by a non-mobile device. In an exemplary aspect, the incorporation of attachments may be part of a task being performed using a document or form, where the task may include use of other functions of the mobile device 130, such as obtaining images and/or a signature, as previously described. FIGS. 10A, 10B, 10C show example displays for a process of extending a mobile device's search function to a non-mobile device according to an exemplary aspect of the disclosure. In the example, the uniquely parameterized hyperlink that is provided in a text message to the mobile device 130 may include a URL for a search microapplication that includes data related to information on the document being processed by the non-mobile device. The microapplication may be informed of a location in the document where attachments are to be listed, and an address in the non-mobile device 110 to store an attachment. After a document has been set up on a screen of the non-mobile device 110, and a communication path between the mobile device 130 and the non-mobile device 110 has been established in S425, a display of the microapplication as shown for example in FIG. 10A may allow the user to search and retrieve a document to be provided as an attachment, such as a legal document, including a pay stub, tax form, bank statement, or other documents that may be necessary for incorporation with the document being processed in the non-mobile device 110. For example, the document on the screen of the non-mobile device 110 may be a Web application for a margin account and may require attachments as part of the application. Instead of asking a user of the mobile device 130 to log into a website that contains necessary documents for applying for a margin account and posting other required documents, the margin account application may be displayed for completion at the side of the non-mobile device 110. The user of the mobile device 130 just needs to select one or more of the required documents. The display provided by the microapplication on the mobile device 130 may provide a search function to assist the user in locating the file. As can be seen in FIG. 10B, the search may result in a list of related files. The user of the mobile device 130 may select one or more of the listed files, which then may be uploaded to the server system 120 as a group of selected files upon pressing an UPLOAD button. In an exemplary aspect, a one-and-the-same relationship may be arranged so that files are immediately uploaded to the server system 120 as they are selected. As shown in FIG. 10C, the uploaded files may be displayed on the non-mobile device 110 and may be listed as attachments to the document for completion of the application process by the user of the non-mobile device 110. The location of the listed attachments in the document displayed in the non-mobile device 110 may be determined by the Web application. In the case of a one-and-the-same relationship, displaying uploaded files as attachments in the document as they are selected in the mobile device 130 enables the mobile device 130 to serve as an auxiliary input device for the non-mobile device 110 to complete a task, without requiring the user to download a mobile app from a website store and setup an account for the app.

Figure 11A:
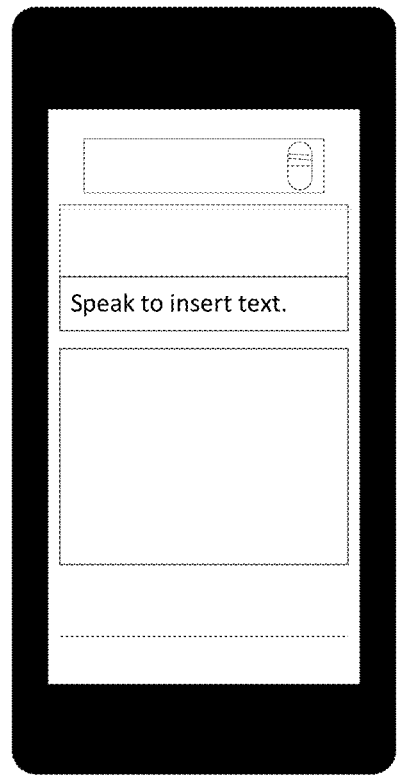
FIGS. 11A, 11B show example displays for a process of extending a mobile device's microphone function to a non-mobile device according to an exemplary aspect of the disclosure.
Figure 11B:
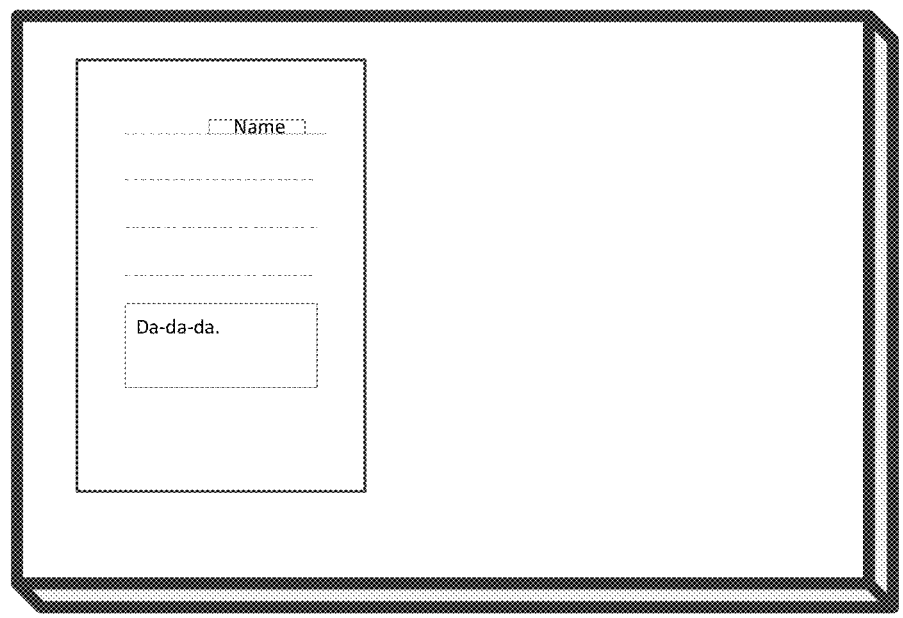

In one embodiment, the microphone function of the mobile device 130 may be made available to the non-mobile device 110 for speech dictation. In an exemplary aspect, the incorporation of microphone function may be part of a task being performed based on a document or form, where the task may also include use of other functions of the mobile device, such as obtaining images and/or a signature, as previously described. FIGS. 11A, 11B show example displays for a process of extending a mobile device's microphone function to a non-mobile device according to an exemplary aspect of the disclosure. In the example, after a document has been set up on a screen of the non-mobile device 110, and a communication path has been established between the mobile device 130 and the non-mobile device 110 has been established S425, a display as shown for example in FIG. 11A may allow the user of the mobile device 130 to enter text for the document by speaking into the microphone of the mobile device 130. In an exemplary aspect, a speech recognition service may be accessed and used to display text on the mobile devices' 130 screen as the user speaks. The text can then be uploaded to the server system 120. In another exemplary aspect, speech recognition may be performed at the server system 120. In that case, the user's speech is saved to a sound file, and the sound file is uploaded to the server system 120. In another exemplary aspect, a one-and-the-same relationship may be arranged in which the server system 120 accesses a speech recognition service to perform speech recognition and display recognized text directly to the non-mobile devices' 110 screen as the user speaks. In an exemplary aspect, portions of the user's speech may be automatically sent to the speech recognition service periodically, such as a predetermined time period of every few seconds. The predetermined time period may be 3 to 10 seconds. Alternatively, the portions of the user's speech may be sent based on a predetermined amount of speech signal. The predetermined amount of speech signal may be based on a pre-established buffer for storing speech signals. As shown in FIG. 11B, the recognized text is inserted into the document on the non-mobile device 110 in a manner that an editing function is available to make any further changes. The document can then be completed on the non-mobile device 110. The one-and-the-same relationship arrangement enables the mobile phone 130 to perform auxiliary functions as though it is an integrated part of the non-mobile device 110, without having to download beforehand a mobile app product from a website store. The mobile app product may not be compatible with the document to be completed. The mobile app product may not be sufficiently integrated to enable insertion of recognized text at a particular location of a document displayed on a non-mobile device 110.

Figure 12A:
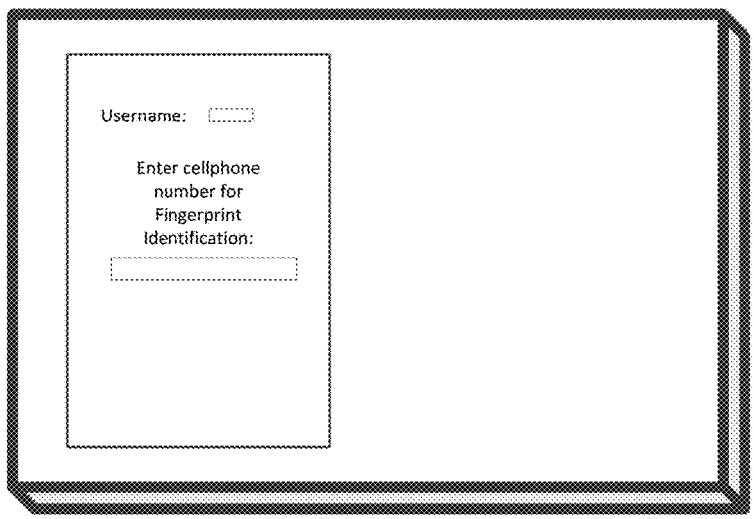
FIGS. 12A to 12D show example displays for a process of extending a mobile device's fingerprint reader function to a non-mobile device according to an exemplary aspect of the disclosure.
Figure 12B:
Figure 12C:
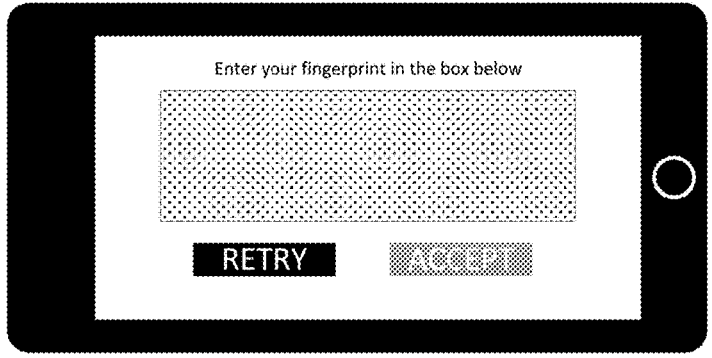
Figure 12D:
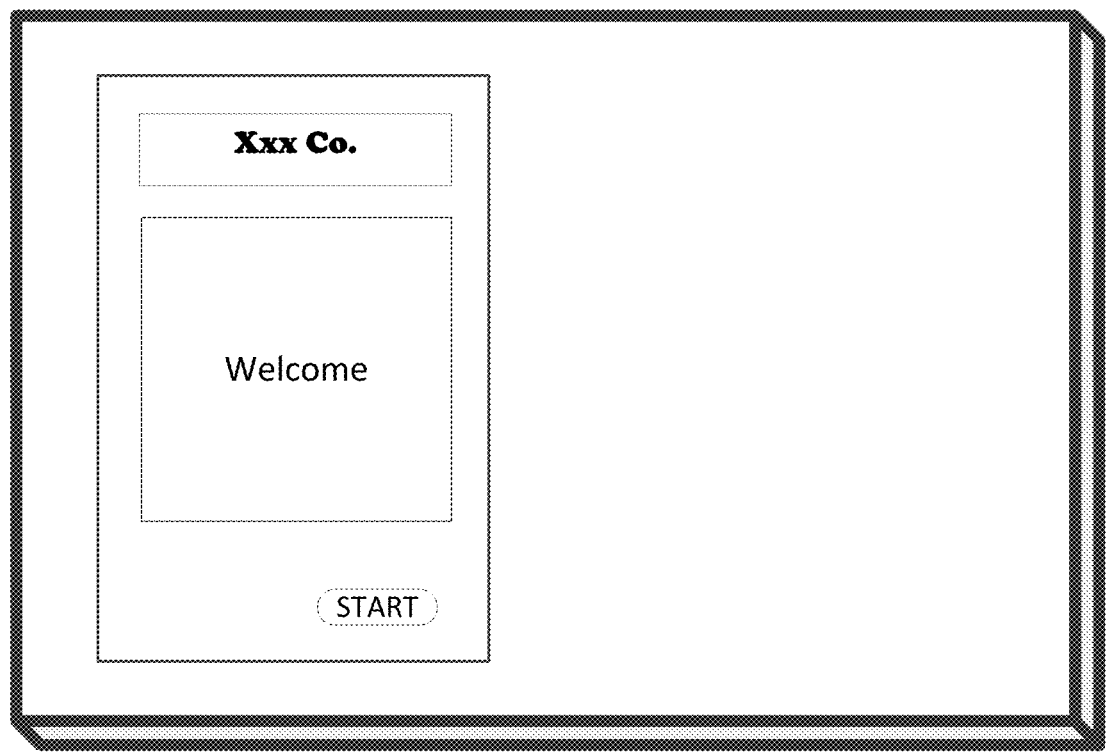

In one embodiment, the touchscreen functions of the mobile device 130 may be made available to the non-mobile device 110 for authentication of a user on the mobile device 130. FIGS. 12A, 12B, 12C, 12D show example displays for a process of extending a mobile device's fingerprint reader function (or facial recognition function) to a non-mobile device according to an exemplary aspect of the disclosure. In an exemplary aspect, when a user on the non-mobile device enters a username in a log-in screen, a web application may generate and send a text message to a previously authenticated mobile number on file. In an alternative exemplary aspect, as shown in FIG. 12A, the log-in screen on the non-mobile device 110 may ask for input of a mobile number or may display an editable mobile number on file. As can be seen in FIG. 12B, the message contains a uniquely parameterized hyperlink that includes a URL for a microapplication and a verification parameter. The microapplication may be informed of the username entered in the log-in screen. As shown in FIG. 12C, the microapplication allows the user to use the mobile device's fingerprint reader (or facial recognition function) to authenticate his/her identity. Although FIG. 12C shows a fingerprint reader that uses a touch screen of the mobile device 130, mobile devices may have other elements that may be used for obtaining a user fingerprint, such as the home button, rear surface of the casing, or other part of the mobile device 130. An authentication certificate is generated using the fingerprint/face and sent with the username provided with the parameterized hyperlink from the mobile device 130 to the server system 120. The server system submits the certificate to the web application's security handling backend to handle logging the user in without requiring a password. As shown in FIG. 12D, the non-mobile 110 web application proceeds to its authenticated state without further action from the user. Because the microapplication is provided to the mobile device 130 based on a hyperlink sent in a message initiated in the non-mobile device 110, the user of the mobile device 130 does not have to obtain a special fingerprint/face app beforehand. Rather, the web application that is performed in the server system 120 enables the mobile device 130 be provided with a microapplication that includes unique parameters sufficient to enter a fingerprint/face and authenticate the user for the web application. In one embodiment, this example may be extended to allow three factor authentication (for example, Username/password plus device possession plus biometric thumbprint—something you know, something you have, and something you are).

Figure 13A:
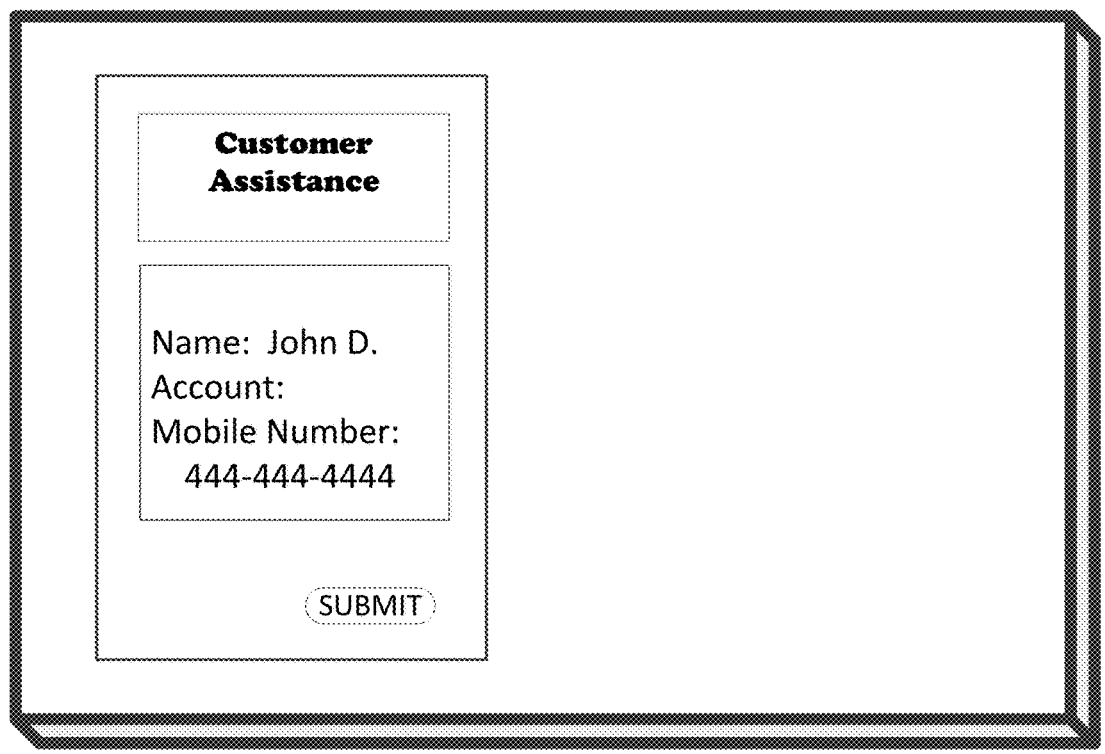
FIGS. 13A to 13F show example displays for a process of extending a mobile device's touchscreen function to a non-mobile device according to an exemplary aspect of the disclosure.

In one embodiment, a session that is started on the non-mobile device 110 can be handed off to the mobile device 130. FIGS. 13A, 13B, 13C, 13D, 13E, 13E show example displays for a process of initiating a session in a non-mobile device 110 and completing the session using a mobile device's touchscreen function according to an exemplary aspect of the disclosure. As an example of a hand-off process, a client may first call her brokerage firm to request margin trading be added to her account. In this disclosure, margin trading involves a request for a line of credit in order to purchase exchange products such as stocks, bonds, and mutual funds. Once margin trading is added to an account, the client can place an order for purchase of an exchange product against the credit line in the margin account. In lieu of directing the client to a blank general-purpose webpage on a website, as shown in FIG. 13A, the brokerage's representative uses Customer Relationship Management (CRM) software on the non-mobile device 110 to order a margin trading microapplication to be sent to the client's mobile device 130. In this disclosure, CRM software maintains information on clients and aids in interacting with and assisting clients for various types of business related actions. In this example, the CRM software aids in interacting with a client to provide assistance in adding margin trading to their existing account. Instead of informing a client over the telephone of a website that they may go to to apply for a margin account, the representative may begin the process of setting up a margin account and pass necessary information that is available in a database associated with the CRM software to the client's mobile device 130 so that the client only needs to complete the application with remaining information. As in other examples described above, a mobile number is submitted to a server system 120 together with information contained in the CRM software. The submitted information is used by the server system 120 to generate a text message that includes a parameterized hyperlink. At this point the representative can conclude the call.

Figure 13B:
Figure 13C:
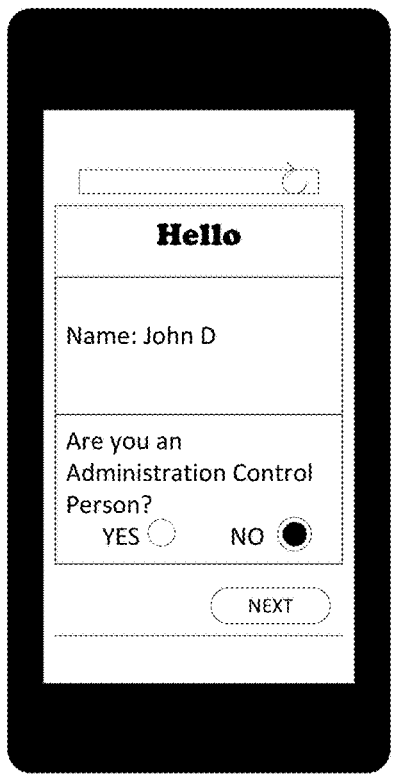
Figure 13D:
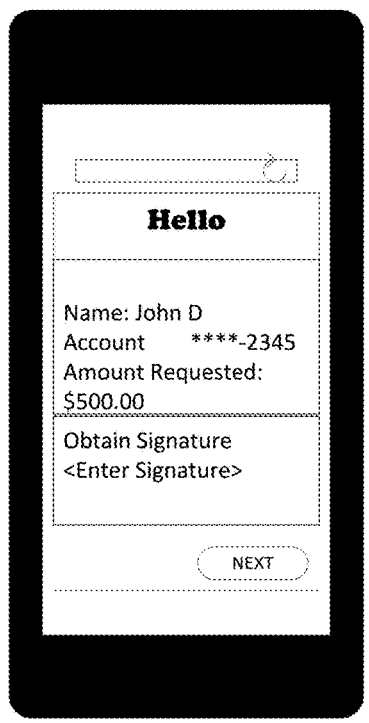
Figure 13E:
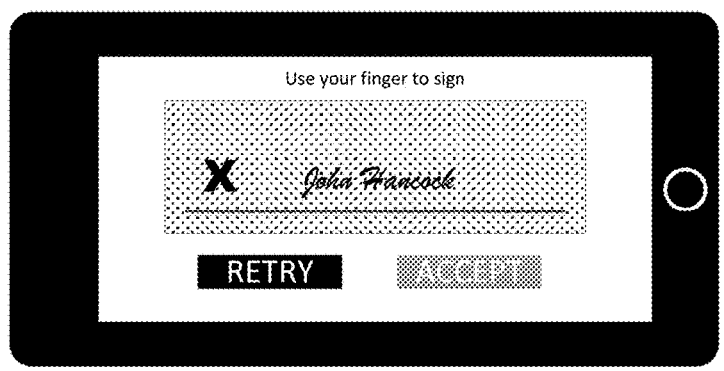
Figure 13F:

As shown in FIG. 13B, the text message containing a uniquely parameterized hyperlink is sent to the client's mobile device 130, and the client taps the hyperlink to, as shown in FIG. 13C, open the microapplication in the mobile device 130. Fields that have existing values in the CRM software database that is a backend system for the server system 120 are prepopulated with information necessary for adding margin trading, such as the client's name, address, and account number. Any fields that do not pertain to either the transaction or the client, such as foreign resident questions for a client with established domestic residence, are not displayed. The client can focus on fields requiring entry thereby streamlining the process. For example, as shown in FIG. 13C the microapplication may ask (via instructions from the server system 120) a question and accept entry of a response in the process of performing a task. As in examples described above, as shown in FIG. 13D the microapplication may assist the client in obtaining a signature using the touchscreen function of the mobile device 130. As shown in FIG. 13E, the client may sign by finger using the mobile device's 130 touchscreen. As shown in FIG. 13F, the client can then submit the margin application from the mobile device 130. In an exemplary aspect, similar to the example screen shown in FIG. 7F, upon submission of the margin application, a verification notice may be transmitted and displayed on the display of the mobile device 130.

Figure 14A:
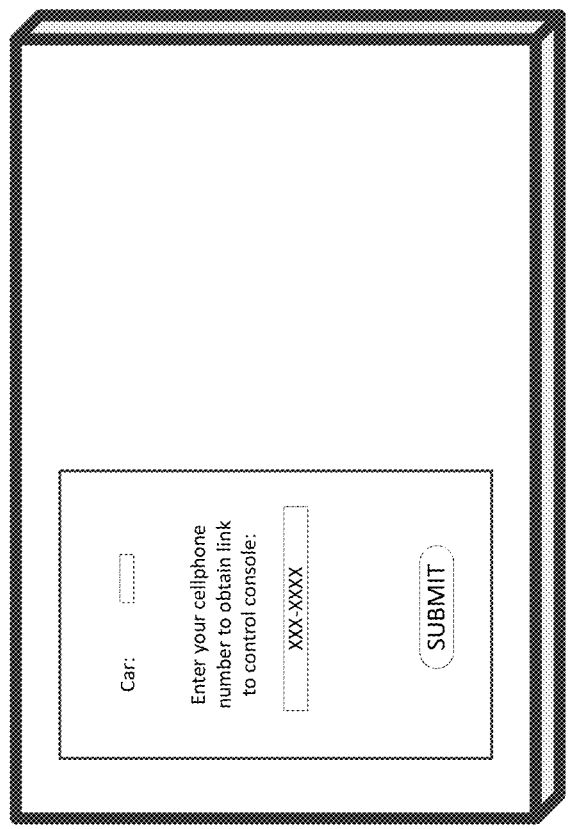
FIGS. 14A to 14C show example displays for a process of extending a non-mobile device's remote control function to a mobile device according to an exemplary aspect of the disclosure.
Figure 14B:
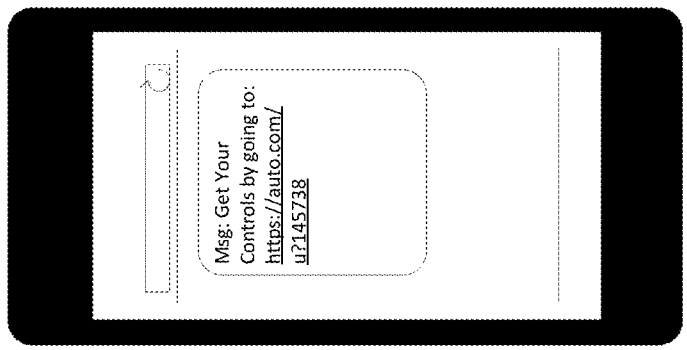
Figure 14C:
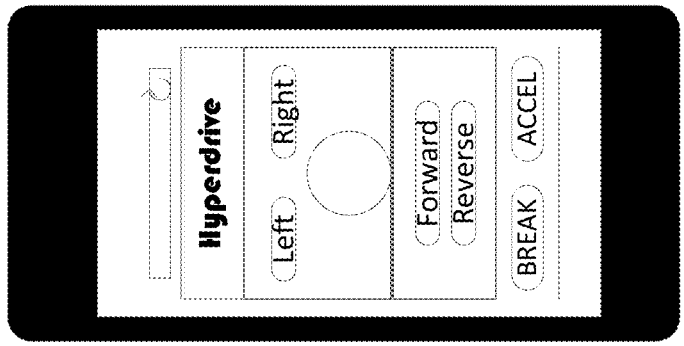

In one embodiment, one or more functions of a mobile device may be enabled for remotely controlling another device. FIGS. 14A, 14B, 14C show example displays for a process of extending a non-mobile device's 110 remote control function to a mobile device 130 according to an exemplary aspect of the disclosure. This exemplary process enables remote control capabilities on a mobile device 130. As shown in FIG. 14A, the user enters a selected car and mobile number at a kiosk in a public place (for example, in order to control a toy racecar on a track nearby) and server system 120 then sends a text message including a uniquely parameterized hyperlink to the user's mobile device 130, as shown in FIG. 14B. The uniquely parameterized hyperlink includes a URL for a microapplication and at least one parameter, including identification of the selected car. When the hyperlink is clicked, as shown in FIG. 14C, a microapplication loads displaying controls for the selected car. The user can then control the car through the mobile device 130. The microapplication obtained based on the parameterized hyperlink is a one-time app containing necessary controls for a selected car. The microapplication is obtained by entry of a mobile number in a kiosk. Thus, a user is able to gain instant control of a selected car without needing to download an app from an app store and perform any setup for the selected car.

Figure 15A:
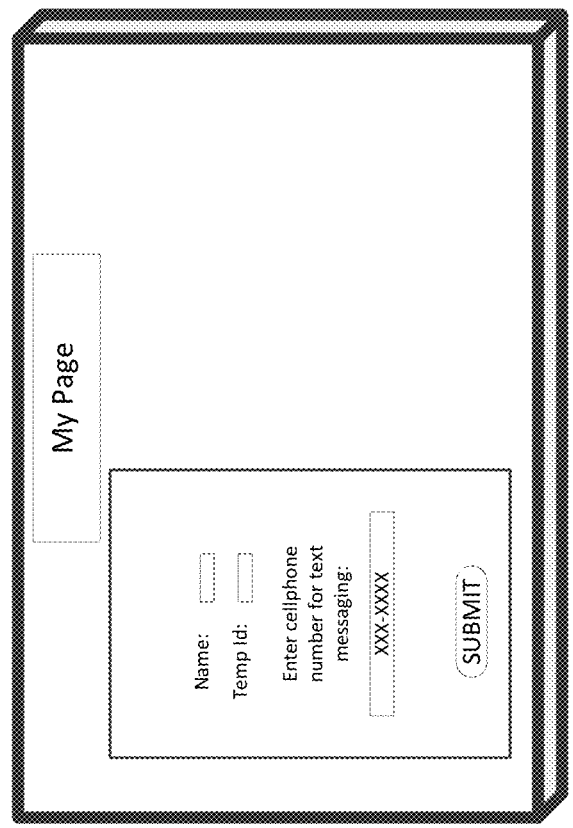
FIGS. 15A to 15E show example displays for a cooperative process of mutual interaction with a mobile device and interaction with a non-mobile device according to an exemplary aspect of the disclosure.
Figure 15B:
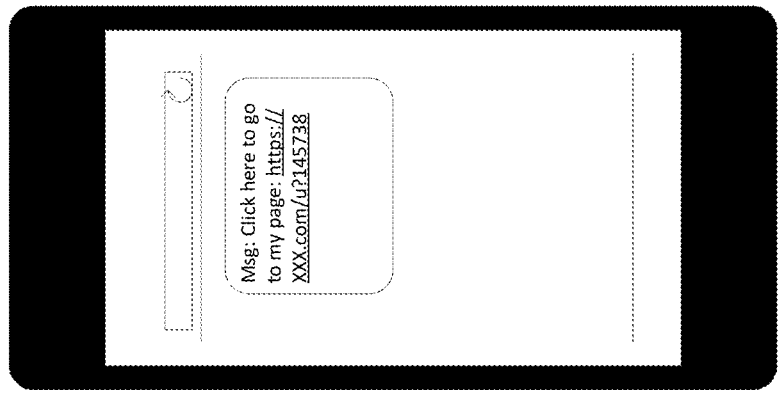

In one embodiment, guidance information may be established at the non-mobile terminal 110 and passed off to the mobile device 130 for interaction with a common web application. FIGS. 15A, 15B, 15C, 15D, 15E show example displays for a cooperative process of mutual interaction with a mobile device 130 and interaction with a non-mobile device 110 according to an exemplary aspect of the disclosure. As an example, a new client may first call a broker asking for guidance on performing a task. The broker asks for the client's mobile number and, as shown in FIG. 15A, uses a web application to enter the client's name, a temporary identification number, and mobile number. The mobile number along with other information entered into the web application is sent to the server system 120, which generates a text message that includes a parameterized hyperlink. The parameterized hyperlink includes a URL for a microapplication and at least one parameter for the other information. The server system 120 may use a messaging service to generate the text message and send the text message to the client, as shown in FIG. 15B. Once the user opens the microapplication, it establishes a communication path back to the broker's web application. In an exemplary aspect, a one-and-the-same relationship is performed between the mobile device 130 and the non-mobile device 110 by way of the mobile device 130 using the microapplication to send requests for instructions to the broker's web application every predetermined time period, such as every 3 seconds.

Figure 15C:
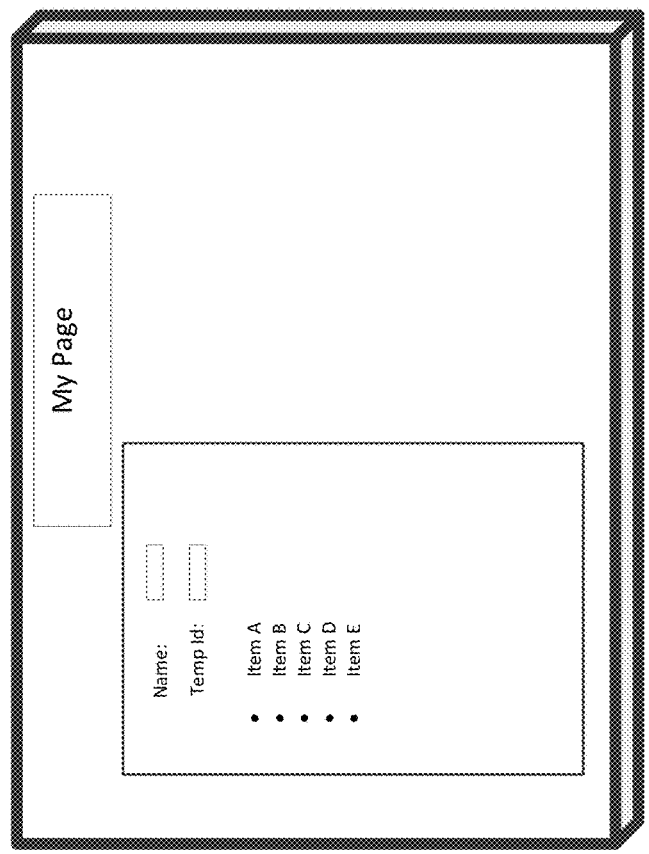
Figure 15D:
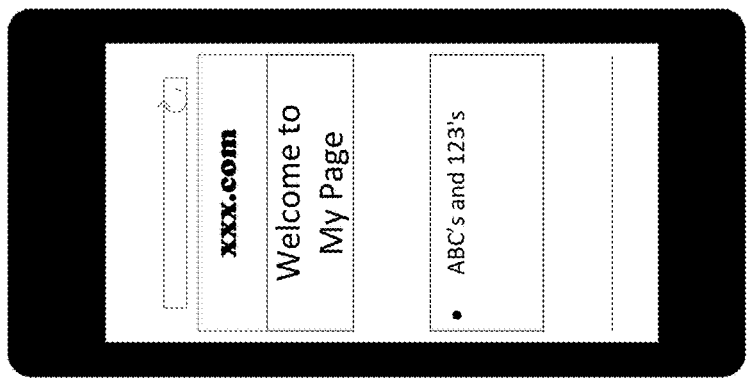
Figure 15E:
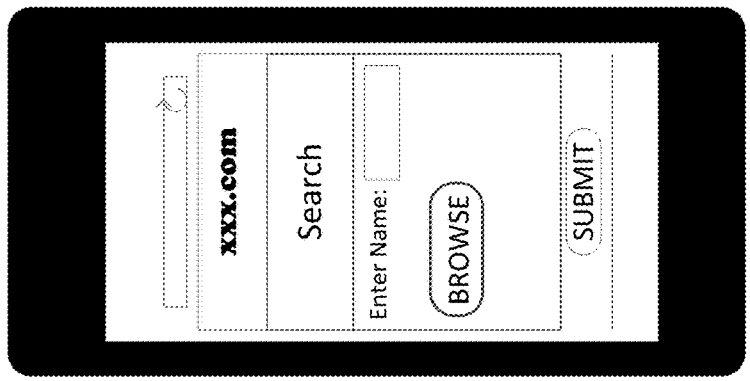

As shown in FIG. 15C, the broker uses the web application to select education screens, which are immediately communicated back to the client's mobile device 130. The selected education screens may be communicated as URLs for the respective screens. As shown in FIG. 15D, the client's mobile device 130 loads the URLs for education screens to display the selected education screens as they are being communicated. By communicating education screens selected by a broker and displaying the selected education screens in the client's mobile device 130 based on instructions sent every predetermined time period, the broker is able to discuss the presented information with the client over the phone in real time. During the discussion, the broker may offer choices of a few items. As a result, a dialog between the broker and the client is simplified and unnecessary steps are avoided. The broker does not need to send elected education screens to the client's mobile device 130 by e-mail or request that the client access a website containing an education screen. The dialog can occur more naturally, as it does not need to be interrupted with questions, such as the client asking for a URL and the broker communicating a URL for an education screen. At that point the client takes over and, as shown in FIG. 15E, can select an item from the mobile device's display.

In one embodiment, microapplications that do not require a password can be protected. In the case of microapplications that are accessed through a texted query string, where the microapplication does not require password authentication and may reside outside of a corporate firewall, one or more security measures are applied. An exemplary aspect is applications will be able to apply sufficient security without the use of a password because factors can be controlled like hashing the URL and expiring the application after a limited amount of time.

In one embodiment, additional authentication can be added to gain access to a microapplication. In addition to any authentication required by a non-mobile device 130, the mobile device 130 may require authentication to gain access to the texted URL contained in the parameterized hyperlink. For example, additional authentication can be added beyond the possession of the device itself including something other than a static password. For example, a phone associate could read a 6 digit access code that will be used exactly one time to gain access to that particular instance of the microapplication.

In one embodiment, persistence of the state of the microapplication may be included. A unique query string texted to the mobile device 130, including a URL, may be retained in a saved folder after the texted link has expired, so that a user can re-access the application at another time. For example, the save folder may be maintained in a mobile application or on a web site.

The above-described embodiments are non-limiting examples that use functions of a mobile device to complete a task. Other embodiments may include using functions of a mobile device not specifically disclosed, performing functions by the mobile device in various orders, and alternative combinations of mobile device functions, may be contemplated without departing from the spirit and scope of the disclosure. For example, the microphone function and signature function of the mobile device may be used in combination to complete a task being performed in the non-mobile device. Other functions may be incorporated into mobile devices as the processing capabilities of these devices progress.

Figure 16:
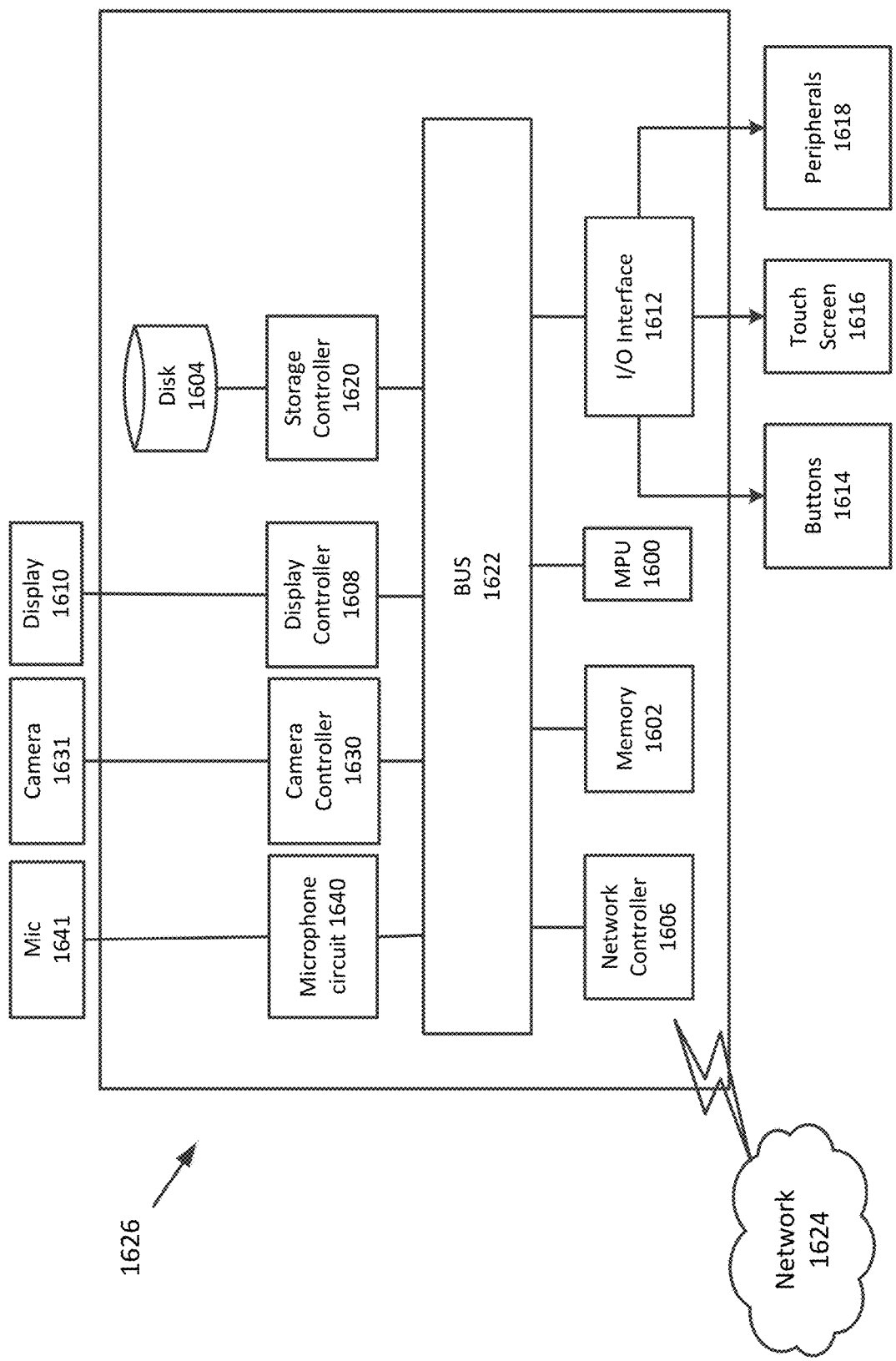
FIG. 16 is a block diagram of a computer system for a mobile device according to an exemplary aspect of the disclosure.
Figure 17:
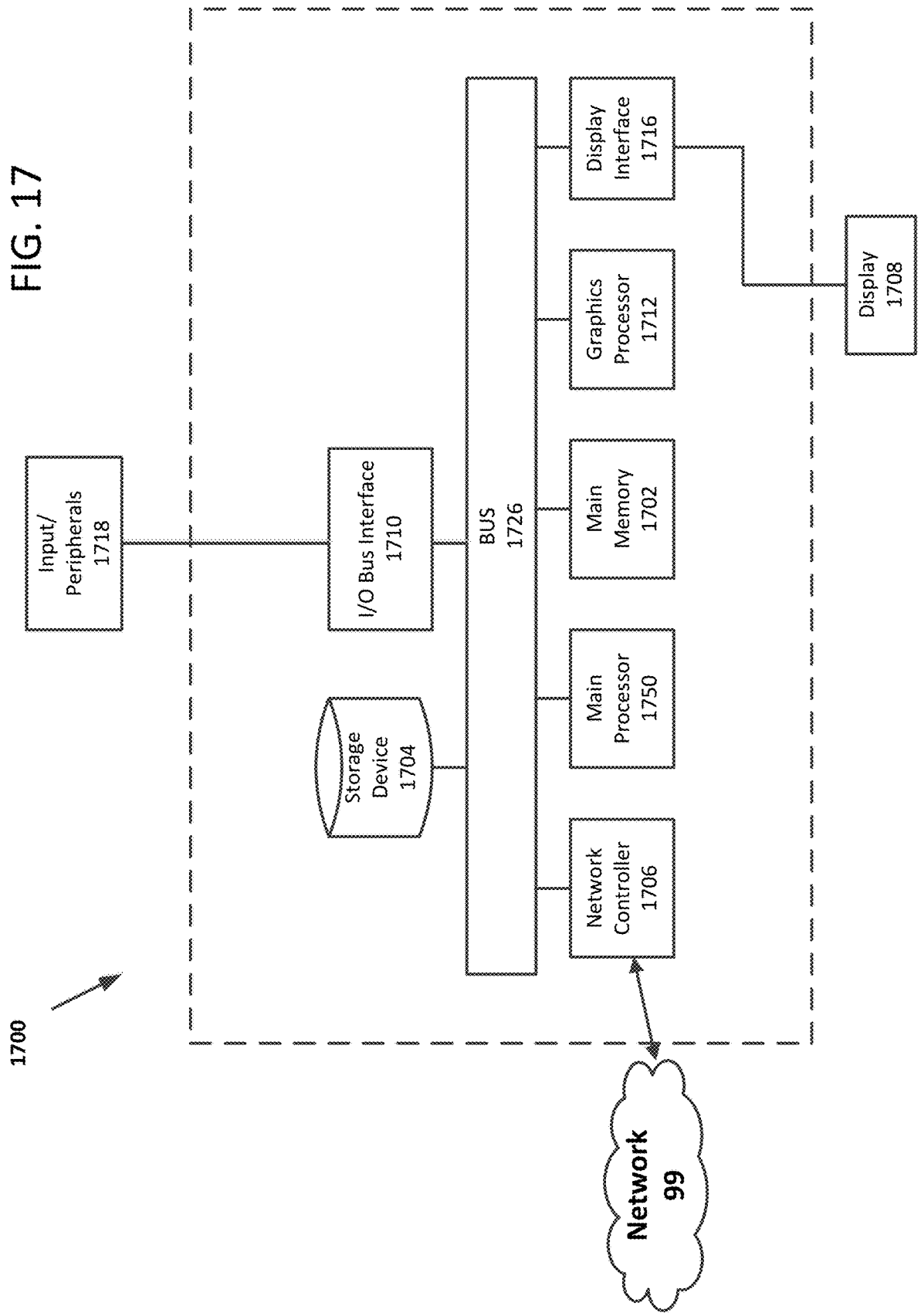
FIG. 17 is a block diagram of a computer system for each of a non-mobile device and a server according to an exemplary aspect of the disclosure.

In one implementation, the functions and processes of the mobile device 130 may be implemented by one or more respective processing circuits 1626. A processing circuit includes a programmed processor as a processor includes circuitry. A processing circuit may also include devices such as an application specific integrated circuit (ASIC) and conventional circuit components arranged to perform the recited functions. Note that circuitry refers to a circuit or system of circuits. Herein, the circuitry may be in one computer system (as illustrated in FIGS. 16 and 17) or may be distributed throughout a network of computer systems. Hence, the circuitry of the server computer system 120 for example may be in only one server or distributed among different servers/computers.

Next, a hardware description of the processing circuit 1626 according to exemplary embodiments is described with reference to FIG. 16. In FIG. 16, the processing circuit 1626 includes a Mobile Processing Unit (MPU) 1600 which performs the processes described herein. The process data and instructions may be stored in memory 1602. These processes and instructions may also be stored on a storage medium disk 1604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, Random Access Memory (RAM), Read Only Memory (ROM), Programmable Read-Only Memory (PROM), Erasable Programmable Read-Only Memory (EPROM), Electrically Erasable Programmable Read Only Memory (EEPROM), hard disk or any other information processing device with which the processing circuit 1626 communicates, such as a server or computer.

Further, the claimed advancements may be provided as a utility application, background daemon, or component of an operating system, or combination thereof, executing in conjunction with MPU 1600 and a mobile operating system such as Android, Microsoft® Windows® 10 Mobile, Apple iOS® and other systems known to those skilled in the art.

In order to achieve the processing circuit 1626, the hardware elements may be realized by various circuitry elements, known to those skilled in the art. For example, MPU 1600 may be a Qualcomm mobile processor, a Nvidia mobile processor, a Atom® processor from Intel Corporation of America, a Samsung mobile processor, or a Apple A7 mobile processor, or may be other processor types that would be recognized by one of ordinary skill in the art. Alternatively, the MPU 1600 may be implemented on an Field-Programmable Gate Array (FPGA), Application Specific Integrated Circuit (ASIC), Programmable Logic Device (PLD) or using discrete logic circuits, as one of ordinary skill in the art would recognize. Further, MPU 1600 may be implemented as multiple processors cooperatively working in parallel to perform the instructions of the inventive processes described above.

The processing circuit 1626 in FIG. 16 also includes a network controller 1606, such as an Intel Ethernet PRO network interface card from Intel Corporation of America, for interfacing with network 1624. As can be appreciated, the network 1624 can be a public network, such as the Internet, or a private network such as LAN or WAN network, or any combination thereof and can also include PSTN or ISDN sub-networks. The network 1624 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The processing circuit 1626 further includes a display controller 1608, such as a NVIDIA® GeForce® GTX or Quadro® graphics adaptor from NVIDIA Corporation of America for interfacing with display 1610. An I/O interface 1612 interfaces with a keyboard and/or mouse 1614 as well as an optional touch screen panel 1616 on or separate from display 1610. I/O interface also connects to a variety of peripherals 1618 including printers and scanners. In addition to the I/O interface 1612 and the display 1610, the processing circuit 1626 may further include a microphone 1641 and one or more cameras 1631. The microphone 1641 may have associated circuitry 1640 for processing the sound into digital signals. Similarly, the camera 1631 may include a camera controller 1630 for controlling image capture operation of the camera 1631. In an exemplary aspect, the camera 1631 may include a Charge Coupled Device (CCD).

The storage controller 1620 connects the storage medium disk 1604 with communication bus 1622, which may be an Industry Standard Architecture (ISA), Extended Industry Standard Architecture (EISA), Video Electronics Standards Association (VESA), Peripheral Component Interface (PCI), or similar, for interconnecting all of the components of the processing circuit 1626. A description of the general features and functionality of the display 1610, keyboard and/or mouse 1614, as well as the display controller 1608, storage controller 1620, network controller 1606, and I/O interface 1612 is omitted herein for brevity as these features are known.

FIG. 17 is a block diagram illustrating an example computer system for implementing each of the non-mobile device 110 and the server computer system 120 according to an exemplary aspect of the disclosure. The computer system 1700 may include one or more main processing circuits 1750 and a display controller such as a graphics processing device 1712. The graphics processing device 1712 may perform mathematical operations of the above method. The computer system 1700 includes main memory 1702 that contains the software being executed by the processing circuits 1750 and 1712, as well as a long term storage device 1704 for storing data and the software programs. The software programs executed by the processing circuits constitute a special purpose computer system 1700. Several interfaces for interacting with the computer system 1700 may be provided, including an I/O Bus Interface 1710, Input/Peripherals 1718 such as a keyboard, mouse, Display Interface 1716 and one or more Displays 1708, and a Network Controller 1706 to enable wired or wireless communication through a network 99. The interfaces, memory and processors may communicate over the system bus 1726, such as a PCI bus.

A system which includes the features in the foregoing description provides numerous advantages. In particular, disclosed embodiments extend Web applications being performed on a non-mobile device 110 to include functions that are available in a mobile device 130. As a result of the embodiments set forth herein, a camera function of a mobile device, for example, may be used to perform steps of a process/task started on a non-mobile device. Hence, a non-mobile device that may not have a camera function may now use the camera function of a mobile device, thereby improving the technological aspects of web-based processes/tasks performed at a non-mobile device. Disclosed embodiments establish one-and-the-same relationship between a non-mobile device 110 and a mobile device 130 such that results of actions performed using the mobile device 130 are immediately reflected in the non-mobile device 110, based on a microapplication that communicates with a Web application of the non-mobile device 110, in which the microapplication is accessed by a uniquely parameterized hyperlink. This again allows an improvement in technology as it provides a seamless/real-time result.

Furthermore, the present disclosure allows for an easy and straightforward methodology of having information entered at the non-mobile device 110 be displayed at the mobile device 130 via the hyperlink by simply providing a mobile number associated with the mobile device 130.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system coordinating communication through a communication path between a mobile device and a non-mobile device, the system comprising:
   at least one server including circuitry configured to
      control execution of a webpage that is displayed on the non-mobile device,
      receive, from the non-mobile device, messaging data that is input via the webpage, the messaging data including a mobile number associated with the mobile device,
      generate a uniform resource locator (URL) for a microapplication and a session-based parameter with a parameter value;
      transmit, to the mobile device, a message using the mobile number received from the non-mobile device, the message including a hyperlink that includes the uniform resource locator (URL) for the microapplication and the parameter with the parameter value,
      in response to the hyperlink being activated on the mobile device which generates an original instance of a verification code based on the transmitted parameter value without user entry of the verification code, simultaneously receive the original instance of the verification code from the mobile device and initiate download of the microapplication to the mobile device, the initiate download including:
      establish the communication path between the mobile device and the non-mobile device upon verifying the verification code,
      obtain portions of content extracted from the webpage displayed on the non-mobile device to populate the microapplication, and
      download the microapplication with the extracted portions of content, handoff control to the mobile device, and control display, via the microapplication, of the extracted portions of content on the mobile device,
      display a request for input data in the webpage,
      in response to performing a function via the microapplication at the mobile device, receive the input data,
      coordinate communication between the mobile device and the non-mobile device to transmit the input data through the communication path to the non-mobile device, and
      control display of the input data received from the mobile device in the webpage of the non-mobile device,
   wherein the circuitry is further configured to
   disable the communication path between the mobile device and the non-mobile device after a predetermined amount of time from a time the message is sent to the mobile device, in response to the input data not being received from the mobile device, and
   when the predetermined amount of time is reached, store the hyperlink and the extracted portions of content in a folder so that the webpage with the extracted portions of content is accessed at a later time.

2. The system of claim 1, wherein
the microapplication is executed by a browser to control display of the extracted portions of content in the mobile device.

3. The system of claim 1, wherein
the microapplication is executed by a mobile e-mail app to control display of the extracted portions of content in the mobile device.

4. The system of claim 1,
wherein the circuitry is further configured to obtain the extracted portions of content, obtain prefill data from a database to further populate the microapplication, download the microapplication with the extracted portions of content and the prefill data, handoff control to the mobile device, control display, via the miocroapplication, of the extracted portions of content and the prefill data on the mobile device, perform a touch input function, via the microapplication, at the mobile device including receiving additional content and obtaining an electronic signature, and submit, via the microapplication, a signed document having the extracted portions of content, the prefill data, and the additional content to the at least one server.

5. The system of claim 1, wherein
the function is a camera function and the input data is an image of a document obtained using the camera function, and
the coordination of the mobile device and the non-mobile device is such that the circuitry is configured to control displaying at the non-mobile device, the image at a time that the image is obtained using the camera function at the mobile device.

6. The system of claim 1, wherein
the function is a touch input function and the input data is an electronic signature, and
the coordination of the mobile device and the non-mobile device is such that the circuitry is configured to control displaying at the non-mobile device, the electronic signature at a time that the electronic signature is obtained using the touch input function at the mobile device.

7. The system of claim 1, wherein
the function is a touch input function and the input data includes blocks of a predetermined number of pixels for respective portions of an electronic signature, and
the coordination of the mobile device and the non-mobile device is such that the circuitry is configured to control displaying at the non-mobile device, the respective portions of the electronic signature in a synchronous fashion with the obtaining of the respective portions of the electronic signature via the touch input function at the mobile device.

8. A method coordinating communication through a communication path between a mobile device and a non-mobile device, the method comprising:
controlling execution, using circuitry, of a webpage that is displayed on the non-mobile device;
receiving, using the circuitry, from the non-mobile device, messaging data that is input via the webpage, the messaging data including a mobile number associated with the mobile device;
generating, using the circuitry, a uniform resource locator (URL) for a microapplication and a session-based parameter with a parameter value;
transmitting, using the circuitry, to the mobile device, a message using the mobile number received from the non-mobile device, the message including a hyperlink that includes the uniform resource locator (URL) for the microapplication and the parameter with the parameter value;
in response to the hyperlink being activated on the mobile device which generates an original instance of a verification code based on the transmitted parameter value without user entry of the verification code, simultaneously receiving the original instance of the verification code from the mobile device[,] and initiating download of the microapplication to the mobile device, the initiating download including:
establishing, using the circuitry, the communication path between the mobile device and the non-mobile device upon verifying the verification code,
obtaining portions of content extracted from the webpage displayed on the non-mobile device to populate the microapplication, and
downloading the microapplication with the extracted portions of content, handing off control to the mobile device, and controlling display, via the microapplication, of the extracted portions of content on the mobile device;
displaying, using the circuitry, a request for input data in the webpage;
in response to performing a function via the microapplication at the mobile device, receiving, using the circuitry, the input;
coordinating, using the circuitry, communication between the mobile device and the non-mobile device to transmit the input data through the communication path to the non-mobile device;
controlling display, using the circuitry, of the input data received from the mobile device in the webpage of the non-mobile device,
disabling the communication path between the mobile device and the non-mobile device after a predetermined amount of time from a time the message is sent to the mobile device, in response to the input data not being received from the mobile device, and
when the predetermined amount of time is reached, storing the hyperlink and the extracted portions of content in a folder so that the webpage with the extracted portions of content is accessed at a later time.

9. The method of claim 8, wherein
a browser executes the microapplication to control display of the extracted portions of content in the mobile device.

10. The method of claim 8, wherein
a mobile e-mail app executes the microapplication to control display of the extracted portions of content in the mobile device.

11. The method of claim 8, further comprising disabling the communication path between the mobile device and the non-mobile device after a predetermined amount of time from a time the message is sent to the mobile device, in response to the input data not being received from the mobile device, and
when the predetermined amount of time is reached, store the hyperlink and the extracted portions of content in a folder so that the webpage with the extracted portions of content is accessed at a later time.

12. The method of claim 8, wherein the obtaining further comprises obtaining, by the circuitry, prefill data from a database to further populate the microapplication, downloading the microapplication with the extracted portions of content and the prefill data, handing off control to the mobile device, controlling display, via the miocroapplication, of the extracted portions of content and the prefill data on the mobile device, performing a touch input function, via the microapplication, at the mobile device including receiving additional content and obtaining an electronic signature, and submitting, via the microapplication, a signed document having the extracted portions of content, the prefill data, and the additional content to the at least one server.

13. The method of claim 8, wherein
the function is a camera function and the input data is an image of a document obtained using the camera function, and
the coordinating of the mobile device and the non-mobile device is such that the display in the non-mobile device displays the image at a time that the image is obtained using the camera function at the mobile device.

14. The method of claim 8, wherein
the function is a touch input function and the input data is an electronic signature, and
the coordinating of the mobile device and the non-mobile device is such that the display in the non-mobile device displays the electronic signature at a time that the electronic signature is obtained using the touch input function at the mobile device.

15. The method of claim 8, wherein
the function is a touch input function and the input data includes blocks of a predetermined number of pixels for respective portions of an electronic signature, and
the coordinating of the mobile device and the non-mobile device is such that the display in the non-mobile device displays the respective portions of the electronic signature in a synchronous fashion with the obtaining of the respective portions of the electronic signature via the touch input function at the mobile device.

16. A non-transitory computer-readable storage medium including computer executable instructions, wherein the instructions, when executed by a computer, cause the computer to perform a method for coordinating communication through a communication path between a mobile device and a non-mobile device, the method comprising:
controlling execution of a webpage that is displayed on the non-mobile device;
receiving from the non-mobile device, messaging data that is input via the webpage, the messaging data including a mobile number associated with the mobile device;
generating a uniform resource locator (URL) for a microapplication and a session-based parameter with a parameter value;
transmitting to the mobile device, a message using the mobile number received from the non-mobile device, the message including a hyperlink that includes the uniform resource locator (URL) for the microapplication and the parameter with the parameter value;
in response to the hyperlink being activated on the mobile device which generates an original instance of a verification code based on the transmitted parameter value without user entry of the verification code, simultaneously receiving the original instance of the verification code from the mobile device[,] and initiating download of the microapplication to the mobile device, the initiating download including:
establishing the communication path between the mobile device and the non-mobile device upon verifying the verification code,
obtaining portions of content extracted from the webpage displayed on the non-mobile device to populate the microapplication, and
downloading the microapplication with the extracted portions of content,
handing off control to the mobile device, and controlling display, via the microapplication, of the extracted portions of content on the mobile device;
displaying a request for input data in the webpage;
in response to performing a function via the microapplication at the mobile device, receiving the input data;
coordinating communication between the mobile device and the non-mobile device to transmit the input data through the communication path to the non-mobile device;
controlling display of the input data received from the mobile device in the webpage of the non-mobile device,
disabling the communication path between the mobile device and the non-mobile device after a predetermined amount of time from a time the message is sent to the mobile device, in response to the input data not being received from the mobile device, and
when the predetermined amount of time is reached, storing the hyperlink and the extracted portions of content in a folder so that the webpage with the extracted portions of content is accessed at a later time.

* * * * *